United States Patent
Choi

(10) Patent No.: US 11,544,077 B2
(45) Date of Patent: Jan. 3, 2023

(54) METHOD FOR SETTING DEVICE BASED ON INFORMATION ASSOCIATED WITH ACCOUNT AND ELECTRONIC DEVICE THEREFOR

(71) Applicant: Samsung Electronics Co., Ltd., Gyeonggi-do (KR)

(72) Inventor: Bokun Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 285 days.

(21) Appl. No.: 16/824,158

(22) Filed: Mar. 19, 2020

(65) Prior Publication Data

US 2020/0301720 A1    Sep. 24, 2020

(30) Foreign Application Priority Data

Mar. 21, 2019   (KR) .................. 10-2019-0032566

(51) Int. Cl.
| | | |
|---|---|---|
| *G06F 9/44* | (2018.01) | |
| *G06F 9/445* | (2018.01) | |
| *H04W 12/06* | (2021.01) | |
| *G06F 21/31* | (2013.01) | |

(52) U.S. Cl.
CPC .......... *G06F 9/44505* (2013.01); *G06F 21/31* (2013.01); *H04W 12/06* (2013.01)

(58) Field of Classification Search
CPC ..... G06F 9/44505; G06F 21/31; H04W 12/06
See application file for complete search history.

(56) References Cited

U.S. PATENT DOCUMENTS

| | | |
|---|---|---|
| 8,689,283 B2 | 4/2014 | Tie et al. |
| 8,744,911 B2 | 6/2014 | Rohan et al. |
| 8,781,454 B2 | 7/2014 | Li et al. |
| 9,838,042 B1 | 12/2017 | Lazier |
| 9,848,079 B2 | 12/2017 | Rauenbuehler et al. |
| 2011/0028126 A1 | 2/2011 | Lim et al. |
| 2011/0296001 A1* | 12/2011 | Ramstrom ............ G06F 21/604 709/224 |

(Continued)

FOREIGN PATENT DOCUMENTS

| | | |
|---|---|---|
| JP | 2014115760 | 6/2014 |
| KR | 100864076 | 10/2008 |

(Continued)

OTHER PUBLICATIONS

International Search Report dated Jul. 2, 2020 issued in counterpart application No. PCT/KR2020/003792, 12 pages.

(Continued)

*Primary Examiner* — Zahid Choudhury
(74) *Attorney, Agent, or Firm* — The Farrell Law Firm, P.C.

(57) ABSTRACT

Methods and electronic devices are provided. Account access information is received, at an electronic device, from an external electronic device. The account access information is transmitted to a server. Account-related information about the external electronic device is received from the server. An account of the external electronic device is logged into based on the account-related information. A configuration of the electronic device is changed while logged into the account of the external electronic device.

20 Claims, 36 Drawing Sheets

(56) References Cited

U.S. PATENT DOCUMENTS

| | | | |
|---|---|---|---|
| 2013/0340044 A1* | 12/2013 | Litvin | G06F 21/36 |
| | | | 709/217 |
| 2014/0173695 A1 | 6/2014 | Valdivia | |
| 2014/0196075 A1 | 7/2014 | Park | |
| 2014/0203999 A1* | 7/2014 | Shim | H04L 67/30 |
| | | | 345/2.2 |
| 2016/0050565 A1 | 2/2016 | Benoit et al. | |
| 2016/0156638 A1* | 6/2016 | Somani | H04W 12/06 |
| | | | 726/7 |
| 2016/0255216 A1 | 9/2016 | Saito | |
| 2017/0244688 A1* | 8/2017 | Kim | G06F 21/6218 |
| 2017/0338959 A1 | 11/2017 | Hong et al. | |
| 2018/0006818 A1 | 1/2018 | Ren | |
| 2018/0167666 A1 | 6/2018 | Wang et al. | |
| 2019/0028514 A1* | 1/2019 | Barboi | H04L 63/108 |

FOREIGN PATENT DOCUMENTS

| | | |
|---|---|---|
| KR | 1020090007825 | 1/2009 |
| KR | 101505590 | 3/2015 |
| KR | 1020160149366 | 12/2016 |
| KR | 1020180057476 | 5/2018 |
| WO | WO 2018/148033 | 8/2018 |

OTHER PUBLICATIONS

European Search Report dated Feb. 16, 2022 issued in counterpart application No. 20772732.2-1224, 10 pages.

\* cited by examiner

METHOD FOR SETTING DEVICE BASED ON INFORMATION ASSOCIATED WITH ACCOUNT AND ELECTRONIC DEVICE THEREFOR

CROSS-REFERENCE TO RELATED APPLICATION(S)

This application is based on and claims priority under 35 U.S.C. § 119(a) to Korean Patent Application No. 10-2019-0032566, filed on Mar. 21, 2019, in the Korean Intellectual Property Office, the entire disclosure of which is incorporated herein by reference.

BACKGROUND

1. Field

The disclosure relates generally to an Internet of things (IoT) environment, and more particularly, to a method for configuring a device based on account-related information and an electronic device therefor.

2. Description of Related Art

An IoT environment requires linking and utilization of various devices. Users may freely control various devices connected via a network and may utilize related content.

Devices linked to one network have different characteristics, making it difficult to satisfy user demands. Devices supporting an IoT function may be personalized devices, such as, for example, a mobile terminal, or may be communal devices shared by a plurality of users, such as, for example, a television (TV) and a refrigerator. All personalized devices may be registered with one account and may be interconnected to be used based on the account.

When a shared device is registered and used with a plurality of accounts at the same time, a conflict in rights occurs. Therefore, right management is necessary to prevent a conflict in rights. Conventional right management is based on policies that prevent a conflict in rights, in which a conflict is solved depending on users' learning and adaptation, rather than being technically solved. Methods that are used include a method of generating a family account and registering and utilizing a device with the family account, a method of transferring some rights of a master account to users having different accounts by the master account inviting a different account, and the like.

Existing technologies for utilizing a shared device in an IoT environment focus on the distribution and sharing of the right to control the shared device. Thus, when data usage by a user is recorded in the shared device, a record of data that needs to be secured may be disclosed to a plurality of users. A data usage record in the shared device may be contaminated by use of other users, making it difficult to apply an artificial intelligence (AI) service that provides various services through the accumulation of input data. A conflict may occur between accounts respectively set for a plurality of services provided by a shared device.

SUMMARY

Embodiments of the disclosure provide a method for temporarily switching an account of an electronic device based on a local area network connection and changing a configuration according to the switched account, and an electronic device therefor.

According to an embodiment, an operating method of an electronic device is provided. Account access information is received from an external electronic device. The account access information is transmitted to a server. Account-related information about the external electronic device is received from the server. An account of the external electronic device is logged into based on the account-related information. A configuration of the electronic device is changed while logged into the account of the external electronic device.

According to an embodiment, an electronic device is provided that includes a display, a communication unit, and a processor. The processor is configured to receive account access information from an external electronic device using a local network, and transmit the account access information to a server. The processor is also configured to receive account-related information about the external electronic device from the server, and log into an account of the external electronic device based on the account-related information. The processor is further configured to change a configuration of the electronic device while logged into the account of the external electronic device.

According to an embodiment, an electronic device is provided that includes a communication unit, a display, and a processor. The processor is configured to detect an input to establish a connection with an external electronic device, establish a direct connection with the external electronic device through a local network upon detecting the input, and transmit account access information to the external electronic device through the connection. Account-related information about the electronic device may be obtained based on the account access information and may be used by the external electronic device to log into an account of the electronic device and to change a configuration of the external electronic device.

BRIEF DESCRIPTION OF THE DRAWINGS

The above and other aspects, features, and advantages of certain embodiments of the disclosure will be more apparent from the following detailed description when taken in conjunction with the accompanying drawings, in which.

DETAILED DESCRIPTION

Figure 1:
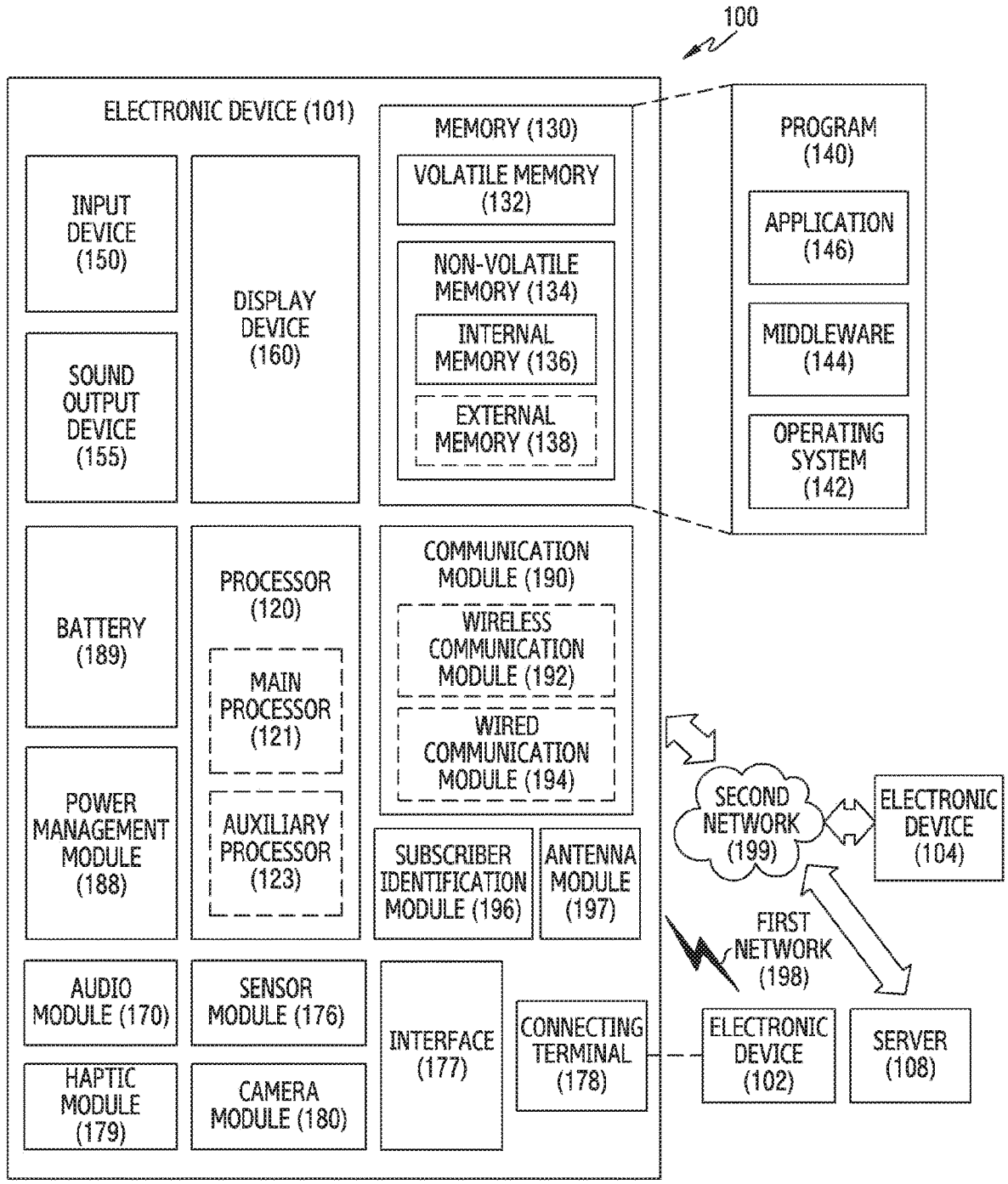
FIG. 1 is a block diagram illustrating an electronic device in a network environment, according to an embodiment.

Embodiments are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the disclosure.

FIG. 1 is a block diagram illustrating an electronic device in a network environment, according to an embodiment.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. In some embodiments, at least one of the components (e.g., the display device 160 or the camera module 180) may be omitted from the electronic device 101, or one or more other components may be added in the electronic device 101. Alternatively, some of the components may be implemented as single integrated circuitry. The sensor module 176 (e.g., a fingerprint sensor, an iris sensor, or an illuminance sensor) may be implemented as embedded in the display device 160 (e.g., a display).

The processor 120 may execute software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include software (e.g., the program 140) and input data or output data for a command related thereto. The memory 130 includes the volatile memory 132 and the non-volatile memory 134.

The program 140 may be stored in the memory 130 as software, and includes an operating system (OS) 142, middleware 144, and an application 146.

The input device 150 may receive a command or data to be used by another component (e.g., the processor 120) of the electronic device 101, from the outside (e.g., a user) of the electronic device 101. The input device 150 may include a microphone, a mouse, a keyboard, or a digital pen (e.g., a stylus pen).

The sound output device 155 may output sound signals to the outside of the electronic device 101. The sound output device 155 may include a speaker or a receiver. The speaker may be used for general purposes, such as, for example, playing multimedia or playing record, and the receiver may be used for incoming calls. The receiver may be implemented as separate from, or as part of the speaker.

The display device 160 may visually provide information to the outside (e.g., a user) of the electronic device 101. The display device 160 may include a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include a high definition multimedia interface (HDMI), a universal serial bus (USB) interface, a secure digital (SD) card interface, or an audio interface.

A connecting terminal 178 may include a connector through which the electronic device 101 may be physically connected with the external electronic device (e.g., the electronic device 102). The connecting terminal 178 may include an HDMI connector, a USB connector, an SD card connector, or an audio connector (e.g., a headphone connector).

The haptic module 179 may convert an electrical signal into a mechanical stimulus (e.g., a vibration or a movement) or electrical stimulus that may be recognized by a user via his tactile sensation or kinesthetic sensation. The haptic module 179 may include a motor, a piezoelectric element, or an electric stimulator.

The camera module 180 may capture a still image or moving images. The camera module 180 may include one or more lenses, image sensors, ISPs, or flashes.

The power management module 188 may manage power supplied to the electronic device 101. The power management module 188 may be implemented as at least part of a power management integrated circuit (PMIC).

The battery 189 may supply power to at least one component of the electronic device 101. The battery 189 may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device 102) of the electronic device 101. The antenna module 197 may include an antenna including a radiating element composed of a conductive material or a conductive pattern formed in or on a substrate (e.g., PCB). The antenna module 197 may include a plurality of antennas. In such a case, at least one antenna appropriate for a communication scheme used in the communication network, such as the first network 198 or the second network 199, may be selected by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 and 104 may be a device of a same type as, or a different type from, the electronic device 101. All or some of operations to be executed at the electronic device 101 may be executed at one or more of the external electronic devices 102, 104, or 108. If the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used.

Figure 2:
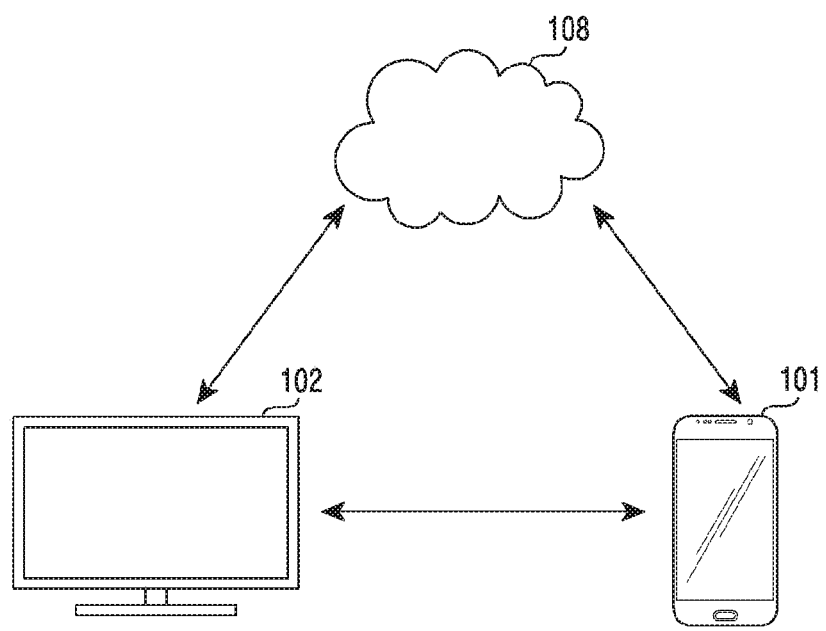
FIG. 2 is a diagram illustrating a method for configuring a device on the basis of account-related information, according to an embodiment.

FIG. 2 is a diagram illustrating a method for configuring a device based on account-related information, according to an embodiment.

Referring to FIG. 2, each of the first electronic device 102 and the second electronic device 101 may operate based on a registered account. Devices registered in a server with the same account may share various types of data based on the registered account, and each device may transmit a control command for another device individually received to the server 108. Devices registered with different accounts may not directly control each other and/or may not share information with each other, and may restrictively exchange control commands when authorized by each user.

The second electronic device 101 (e.g., a mobile terminal) registered with account B may transmit information enabling the first electronic device 102 to obtain account B to the first electronic device 102 through a local connection (e.g., Wi-Fi Direct or Wi-Fi Aware), and the first electronic device 102, registered with account A, may be temporarily registered and operate with account B on the basis of the information. To temporarily register account B during the local connection between the first electronic device 102 and the second electronic device 101, consent of a user of the first electronic device 102 may be required.

When the first electronic device 102 is temporarily registered with account B, the first electronic device 102 may receive configuration information stored in the server 108 using information about account B and may change a configuration of the first electronic device 102 using the configuration information. A user of the second electronic device 101 may temporarily use the first electronic device 102 with the same user experience.

When the local connection is released, the first electronic device 102 may remove the information about account B in which the first electronic device 102 temporarily logs, may restore account A, which is a default account (i.e., an account of the user of the first electronic device 102), and may return to a state before the local connection.

Figure 3:
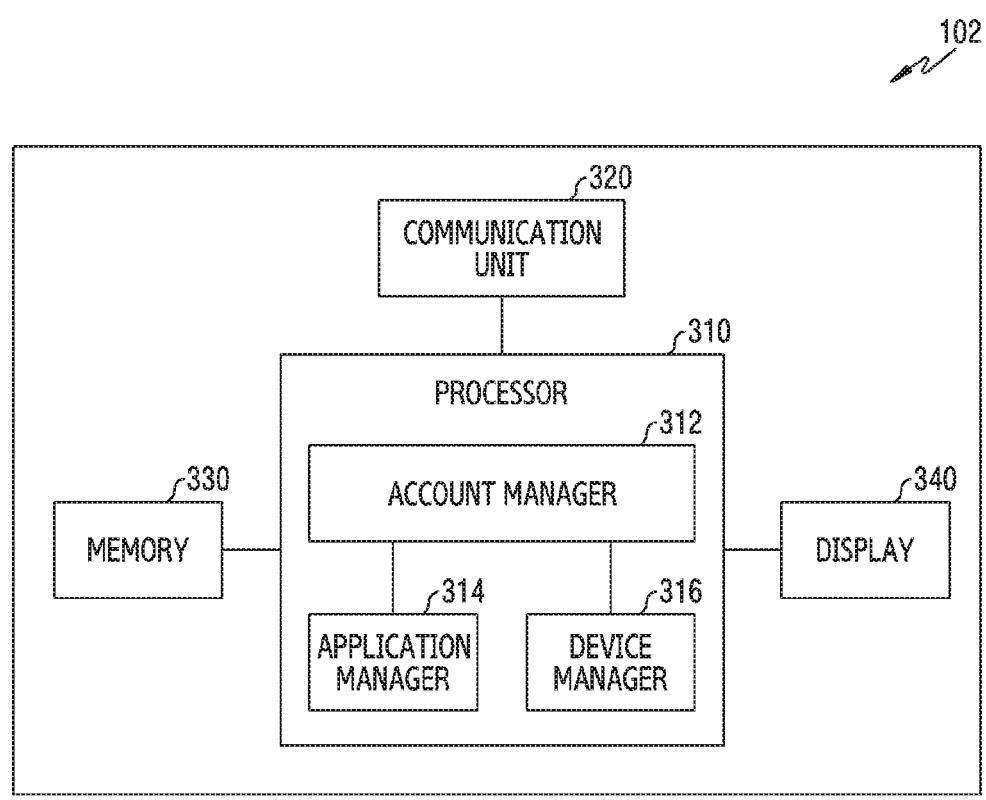
FIG. 3 is a block diagram illustrating a first electronic device that configures a device based on account-related information, according to an embodiment of the disclosure.

FIG. 3 is a block diagram illustrating a first electronic device that configures a device based on account-related information, according to an embodiment.

Referring to FIG. 3, the first electronic device 102 includes a processor 310 (e.g., the processor 120 of FIG. 1), a communication unit 320 (e.g., the communication module 190 of FIG. 1), a memory 330 (e.g., the memory 130 of FIG. 1), and a display 340 (e.g., the display device 160 of FIG. 1).

The processor 310 may control the overall operation of the first electronic device 102. The processor 310 may control at least one other component (e.g., a hardware or software component) connected to the processor 310 and may perform various types of data processing or operations. As at least part of the data processing or operations, the processor 310 may load a command or data received from another component into the memory, may process a command or data stored in the memory, and may store the resulting data in the memory. The processor 310 may control each function of the first electronic device 102 through information exchange with a server 108 or a second electronic device 101 based on an account of the first electronic device 102 or may change a configuration of the first electronic device 102. The processor 130 may receive configuration information about at least one application installed in the first electronic device 102 from the server 108 and may transmit the configuration information to each application.

The processor 310 includes an account manager 312, an application manager 314, and a device manager 316. Each of these components of the processor 310 may be configured as hardware, software, or a combination of hardware and software.

The account manager 312 may control to perform login to at least one application installed in the first electronic device 102 or the first electronic device 102 based on an account requested from the server 108 and/or the second electronic device 101. The account manager 312 may control to perform login to and/or logoff from an application installed in the first electronic device 102 by interworking with the application manager 314 and/or the device manager 316, or may control to change the configuration of the first electronic device 102. The application manager 314 may perform overall control related to at least one application in the first electronic device 102. The application manager 314 may control to install at least one application in the first electronic device 102 or to remove at least one application from the first electronic device 102. The device manager 316 may perform overall control related to the configuration of the first electronic device 102. When the first electronic device 102 is a TV, the device manager 316 may control a preferred channel, volume, contrast, and/or brightness.

The communication unit 320 may support establishing a direct (e.g., wired) communication channel or a wireless communication channel between the first electronic device 102 and the second electronic device 101 or the server 108 and performing communication through the established communication channel. The communication unit 320 may include a wireless communication module (e.g., a cellular communication module, a short-range wireless communication module, or a global navigation satellite system (GNSS) communication module) or a wired communication module (e.g., a local area network (LAN) communication module or a power-line communication module). Among these communication modules, a corresponding communication module may communicate with an external electronic device via the first network (e.g., a short-range communication network including a Bluetooth, Wi-Fi Direct, Wi-Fi Aware, or infrared data association (IrDA) network) or a network (e.g., a long-range communication network including a cellular network, the Internet, or a computer network (e.g., a LAN or WAN)). These various types of communication modules may be integrated into one component (e.g., a single chip) or may be configured as a plurality of separate components (e.g., a plurality of chips). The communication unit 320 may include a framework for processing data in a standard manner for communication with the server 108. The communication unit 320 may process data to be compatible with an Open Connectivity Foundation (OCF) protocol or an IoT communication protocol, such as one machine-to-machine (M2M), for data communication to control and configure a different electronic device registered in the server 108 with the same account as that of the first electronic device 102.

The memory 330 may store various data used by at least one component (e.g., the processor 310) of the first electronic device 102. The data may include software, account-related information, configuration information about the first electronic device 102, and input data or output data about a command associated therewith.

The display 340 may visually and/or audibly provide information to the first electronic device 102. The display 340 may include at least one light emitting diode (LED), a speaker, or a control circuit for controlling a display and may output a sound through an audio output device or an external device (e.g., a speaker or a headphone) connected directly or wirelessly to the first electronic device 102.

According to an embodiment, an electronic device may include a display 340, a communication unit 320, and a processor 310. The processor 310 may be configured to receive account access information from a different electronic device using a local network, transmit the account access information to a server 108, and receive account-related information about the different electronic device from the server 108. The processor 310 may also be configured to log into an account of the different electronic device based on the account-related information and change a configuration of the electronic device while logged into the account of the different electronic device.

The processor 310 may be further configured to receive the account access information from the different electronic device, when the electronic device is directly connected to the different electronic device through the local network. The direct connection through the local network may be based on one of Wi-Fi Direct, Wi-Fi Aware, ultra-wideband (UWB), Bluetooth, and long-term evolution (LTE)-Direct.

The processor 310 may be further configured to log off from the account of the different electronic device upon releasing the connection through the local network, to log in a default account of the electronic device, and to restore the configuration of the electronic device.

The account access information may include media access control (MAC) specifying the different electronic device and information for identifying the account of the different electronic device on the basis of the MAC.

The account-related information may include at least one of hardware account-related information, OS account-related information, network provider and service provider account-related information, information about at least one service account linked with the account of the different electronic device, information about at least one application installed with the account of the different electronic device, and environmental information about the electronic device.

The processor 310 may be further configured to log into the at least one service account linked with the account of the different electronic device or the account of the at least one application installed in the different electronic device based on the account-related information.

The processor 310 may be further configured to change a configuration of an application installed in the electronic device based on the account-related information.

The electronic device may receive, from the server 108, at least one of information about at least one service account linked with the account of the different electronic device, information about at least one application installed with the account of the different electronic device, and environmental information about the electronic device, when logging into the account of the different electronic device.

An electronic device may include a communication unit, a display, and a processor. The processor may be configured to detect an input to establish a connection with a different electronic device, establish a direct connection with the different electronic device through a local network upon detecting the input, and transmit account access information to the different electronic device through the connection. The different electronic device may obtain account-related information about the electronic device, and the account-related information may be used to log in an account of the electronic device and to change a configuration of the different electronic device.

The processor may be further configured to display a first interface including a first object for connecting with the different electronic device, display a second interface including a second object indicating a general connection and a third object indicating a connection for an account switch upon detecting an input to the first object, and establish the connection with the different electronic device and transmit the account access information upon detecting the input to the third object.

The account access information may include MAC specifying the electronic device and information for identifying the account of the electronic device based on the MAC.

The account-related information may include at least one of hardware account-related information, OS account-related information, network provider and service provider account-related information, information about at least one service account linked with the account of the electronic device, information about at least one application installed with the account of the electronic device, and environmental information about the different electronic device.

The processor may be further configured to generate a temporary account for the account of the electronic device. The account access information may be information about the temporary account.

The processor may be further configured to delete the information about the temporary account when the connection with the different electronic device is released.

The processor may be further configured to transmit a connection release request message to the different electronic device when the strength of a communication signal between the different electronic device and the electronic device is determined to be a predetermined strength or less.

The processor may be configured to transmit a message requesting logging off of the different electronic device from the account of the electronic device, to a server 108, when the connection with the different electronic device is released.

The processor may be further configured to transmit the account access information to the different electronic device when identifying that the electronic device is positioned at a predetermined distance and at a predetermined angle from the different electronic device.

Figure 4:
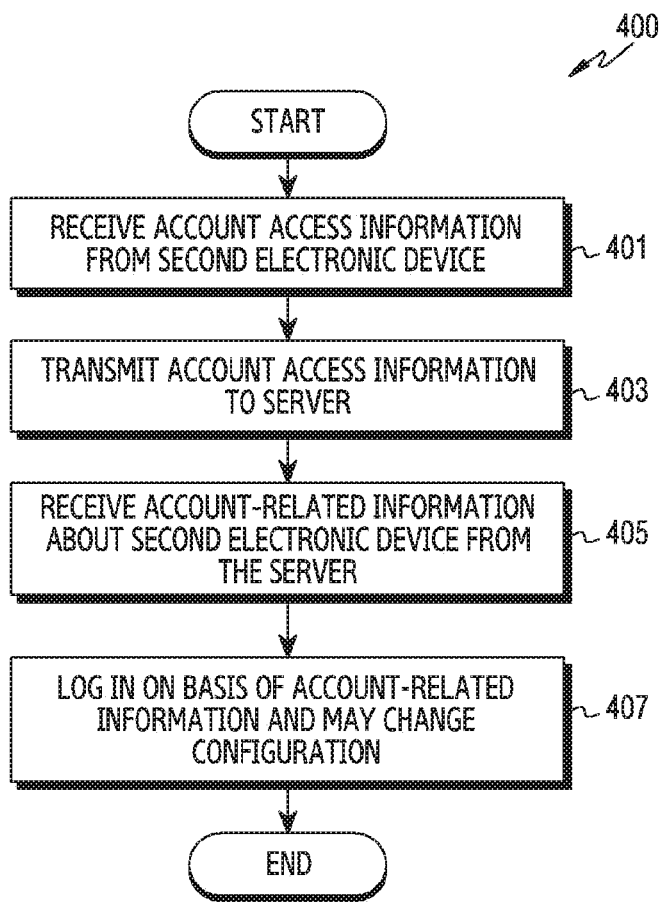
FIG. 4 is a flowchart illustrating an operating method of a first electronic device that configures a device based on account-related information, according to an embodiment.
Figure 5:
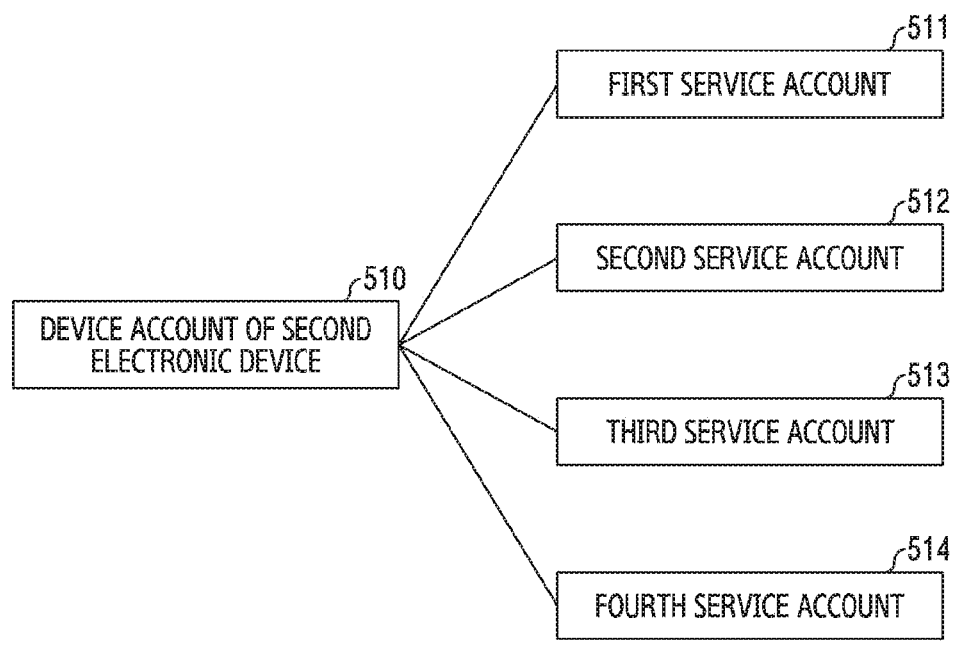
FIG. 5 is a diagram illustrating a plurality of service accounts linked with a device account of a second electronic device, according to an embodiment.

FIG. 4 is a flowchart illustrating an operating method of a first electronic device that configures a device based on account-related information, according to an embodiment. FIG. 5 is a diagram illustrating a plurality of service accounts linked with a device account of a second electronic device, according to an embodiment. The subject of operations in a flowchart 400 of FIG. 4 may be understood as the first electronic device 102 or a component (e.g., the processor 310) of the first electronic device 102.

Referring to FIG. 4, in operation 401, the first electronic device 102 (e.g., the processor 310) receives account access information from a second electronic device 101. The account access information may be information that allows the first electronic device 102 to obtain account-related information about the second electronic device 101. The account access information may include information generated for identifying the account, information for accessing the account, and/or at least some of MAC information for specifying the second electronic device 101 and a server address for identifying a registered account of the second electronic device 101 using MAC. The account access information may be referred to as a token, a key, a code, or other terms having an equivalent technical meaning. The account-related information may include hardware account-related information (e.g. a Samsung account and an Android account), OS account-related information (e.g. a Windows account), or network provider (e.g. a Vodafone account, a Verizon account, and a Telefonica account) and service provider (e.g., a Google account, a Facebook account, and an Instagram account) account-related information. The first electronic device 102 may receive account information about the second electronic device 101 directly from the second electronic device 101. The first electronic device 102 may receive the account access information from the second electronic device 101 through a peer-to-peer (P2P)-based short-range communication network (e.g., Wi-Fi Direct or Wi-Fi Aware).

In operation 403, the first electronic device 102 transmits the account access information to a server 108. The first electronic device 102 may transmit the received account access information to the server 108 upon receiving the account access information from the second electronic device 101.

In operation 405, the first electronic device 102 receives the account-related information about the second electronic device 101 from the server 108. The account-related information may be information about a device account of the second electronic device 101. The server 108 may receive and store in advance the account access information from the second electronic device 101, and may provide the account-related information about the second electronic device 101 to a different device other than the second electronic device 101 upon receiving the account access information from the different device.

Referring to FIG. 5, the account-related information may include information about a plurality of service accounts 511, 512, 513, and 514 linked with a device account 510 of the second electronic device 101 or a set of login information. The server 108 may manage the plurality of service accounts 511, 512, 513, and 514 linked with the device account 510 of the second electronic device 101 together and may transmit the information about the plurality of service accounts 511, 512, 513, and 514 to the first electronic device 102 according to a request from the first device 102. The account-related information may include environmental information about the configuration and other environments of the first electronic device 102 and/or the configuration and other environments of an application installed in the first electronic device 102. The device account 510 of the second electronic device 101 and the plurality of service accounts 511, 512, 513, and 514 may be linked by performing advance account linking.

Referring back to FIG. 4, in operation 407, the first electronic device 102 logs in based on the account-related information received from the server 108 and changes the configuration of the first electronic device 102. The first electronic device 102 may switch an existing device account of the first electronic device 102 to the device account 510 of the second electronic device 101 based on the account-related information. The first electronic device 102 may log in to a service corresponding to each of the plurality of service accounts 511, 512, 513, and 514 linked with the device account 510 of the second electronic device 101 using each account on the basis of the account-related information. A user may have an effect of logging into a plurality of services linked with the second electronic device 101 only by logging in with the device account 510 of the second electronic device 101 through a local connection. The first electronic device 102 may temporarily change the configuration based on the environmental information included in the account-related information about the second electronic device 101 received from the server 108. Alternatively, the first electronic device 102 may receive various pieces of environmental information registered with an account of the second electronic device 101 from the server using the account-related information about the second electronic device 101 received from the server 108 and may temporarily change the configuration of the first electronic device 102 based on the pieces of environmental information. When the first electronic device 102 is a TV, the environmental information may be information about a preferred channel, volume, contrast, and/or brightness, and a preferred channel, volume, contrast, and/or brightness of the first electronic device 102 may be changed based on the environmental information. The environmental information about the first electronic device 102 may be changed using the account-related information about the second electronic device 101 in a server managing account information about the first electronic device 102 or a cloud server connected to this server.

As described with reference to FIG. 4, the first electronic device 102 may switch the logged-in account using the account access information received from the second electronic device 101. A switch of accounts may be temporary, and the first electronic device 102 may log in again with a default account when a predefined event associated with the second electronic device 101 occurs. When a network connection with the second electronic device 101 is released, the first electronic device 102 may switch to the default account of the first electronic device 102 and may change to a default configuration. A process after the network connection between the first electronic device 102 and the second electronic device 101 is released is described in greater detail below with reference to FIG. 6.

When the first electronic device 102 switches to the device account of the second electronic device 101, additional authentication of the second electronic device 101 may be required. Some functions of the second electronic device 101 may be performed only by login based on a local connection, and some other functions of the second electronic device 101 may be performed by the first electronic device 102 via additional authentication of fast identity online (FIDO) information, such as, for example, a fingerprint, an iris, and a vein, input to the second electronic device 101. The additional authentication may be performed using a password and may be performed using FIDO information, such as, for example, a fingerprint, an iris, face recognition, and a vein.

The first electronic device 102 may be allowed to perform only a preparation procedure for login with the device account of the second electronic device 101 through the local connection between the second electronic device 101 and the first electronic device 102, and may be allowed to switch an account and to log in to an installed application via additional authentication of the user of the second electronic device 101.

Figure 6:
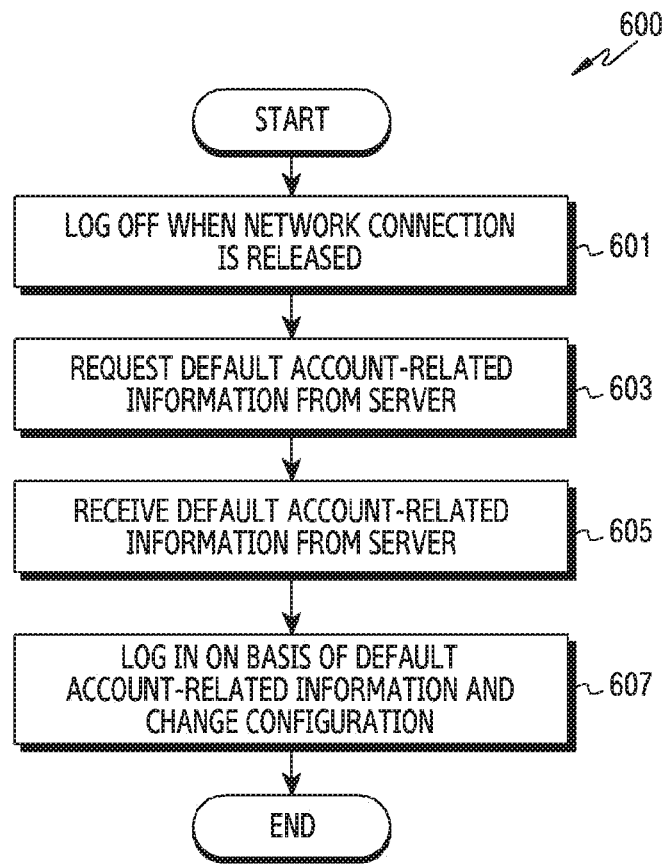
FIG. 6 is a flowchart illustrating an operating method of a first electronic device that configures a device based on account-related information when a network connection is released, according to an embodiment.

FIG. 6 is a flowchart illustrating an operating method of a first electronic device that configures a device based on account-related information when a network connection is released, according to an embodiment. The subject of operations in a flowchart 600 of FIG. 6 may be understood as the first electronic device 102 or a component (e.g., the processor 310) of the first electronic device 102.

Referring to FIG. 6, in operation 601, when a network connection with a second electronic device 101 is released, the first electronic device 102 logs off from a currently used account of the second electronic device 102 based on account information about the second electronic device 101. The network connection between the first electronic device 102 and the second electronic device 101 may be established by Wi-Fi Direct, Wi-Fi Aware, ultra-wideband (UWB), near-field communication (NFC), ZigBee, Z-wave, Bluetooth, LTE-Direct, FlashLinQ, DataSpotting, relay-bysmartphone, or a similar device-to-device (D2D) connection method. The network connection between the first electronic device 102 and the second electronic device 101 may be released when a disconnection request is made by the first electronic device 102 or the second electronic device 101, when the first electronic device 102 or the second electronic device 101 is powered off, or when the strength of a communication signal between the first electronic device 102 and the second electronic device 101 is determined to be a predetermined strength or less. The first electronic device 102 may log off the device account of the second electronic device 101 and may simultaneously log off a plurality of service accounts linked with the device account of the second electronic device 101.

In operation 603, the first electronic device 102 requests default account-related information from a server 108. Upon logging off the device account of the second electronic device 101, the first electronic device 102 transmit a message requesting default account-related information about the first electronic device 102 to the server 108. A default account may be a device account of the first electronic device 102 set by a user.

In operation 605, the first electronic device 102 receives the default account-related information from the server 108. The default account-related information may include information about the device account of the first electronic device 102, information about a plurality of service accounts linked with the device account of the first electronic device 102, and/or environmental information about the first electronic device 102.

In operation 607, the first electronic device 102 logs in based on the default account-related information and changes a configuration of the first electronic device 102. That is, the first electronic device 102 may switch the device account of the second electronic device 101, to which the first electronic device 102 has temporarily switched, back to the default account of the first electronic device 102. The first electronic device 102 may return to a state before logging in with the device account of the second electronic device 101 based on the default account-related information.

Operations 603 and 605 of FIG. 6 may be omitted. The first electronic device 102 may store the device account of the first electronic device 102, the information about the plurality of service accounts linked with the device account of the first electronic device 102, and the environmental information about the first electronic device 102 in a memory having areas physically or logically divided for security before logging in with the device account of the second electronic device 101. The first electronic device may then load the device account of the first electronic device 102, the information about the plurality of service accounts linked with the device account of the first electronic device 102, and the environmental information about the first electronic device 102 back from the memory when logging off the device account of the second electronic device 101.

The server 108 may directly control a logoff operation of the first electronic device 102. That is, when the network connection between the first electronic device 102 and the second electronic device 101 is terminated, the second electronic device 101 may transmit a request for logoff of the first electronic device 102 from the device account of the second electronic device 101 to the server 108, and the server 108 may transmit a command to the first electronic device 102 in response to the request so that the first electronic device 102 logs off the device account of the second electronic device 101.

The first electronic device 102 may maintain login to the device account of the second electronic device 101 while periodically receiving a verification signal for the device account of the second electronic device 101 through connected a network from the second electronic device 101. When the verification signal is not received, the first electronic device 102 may automatically log off the device account of the second electronic device 101. The verification signal from the second electronic device 101 may be transmitted to the first electronic device 102 through the server 108 while maintaining the network connection between the first electronic device 102 and the second electronic device 101.

Information about logoff of the first electronic device 102 from the device account of the second electronic device 101 may be transmitted to the server 108, and the second electronic device 101 may receive, through the server 108, information about logoff of the first electronic device 102 from the device account of the second electronic device 101 and the plurality of service accounts linked with the device account of the second electronic device 101. The first electronic device 102 may notify the user of the information about the logoff through the second electronic device 101 or a different electronic device registered with the same account as the device account of the second electronic device 101. The information about the logoff may be notified by a voice message and/or a message displayed on the screen of the electronic device.

When the first electronic device 102 is powered off and cannot log off the device account of the second electronic device 101, the first electronic device 102 may perform logoff from the device account of the second electronic device 101 again when powered on gain. The second electronic device 101 may receive information indicating that logoff is waiting or that logoff has been completed through the server 108.

The first electronic device 102 may log in and operate with the default account of the first electronic device 102 whenever the power is off. The first electronic device 102 may operate with the default account of the first electronic device 102 whenever the power is applied.

Figure 7A:
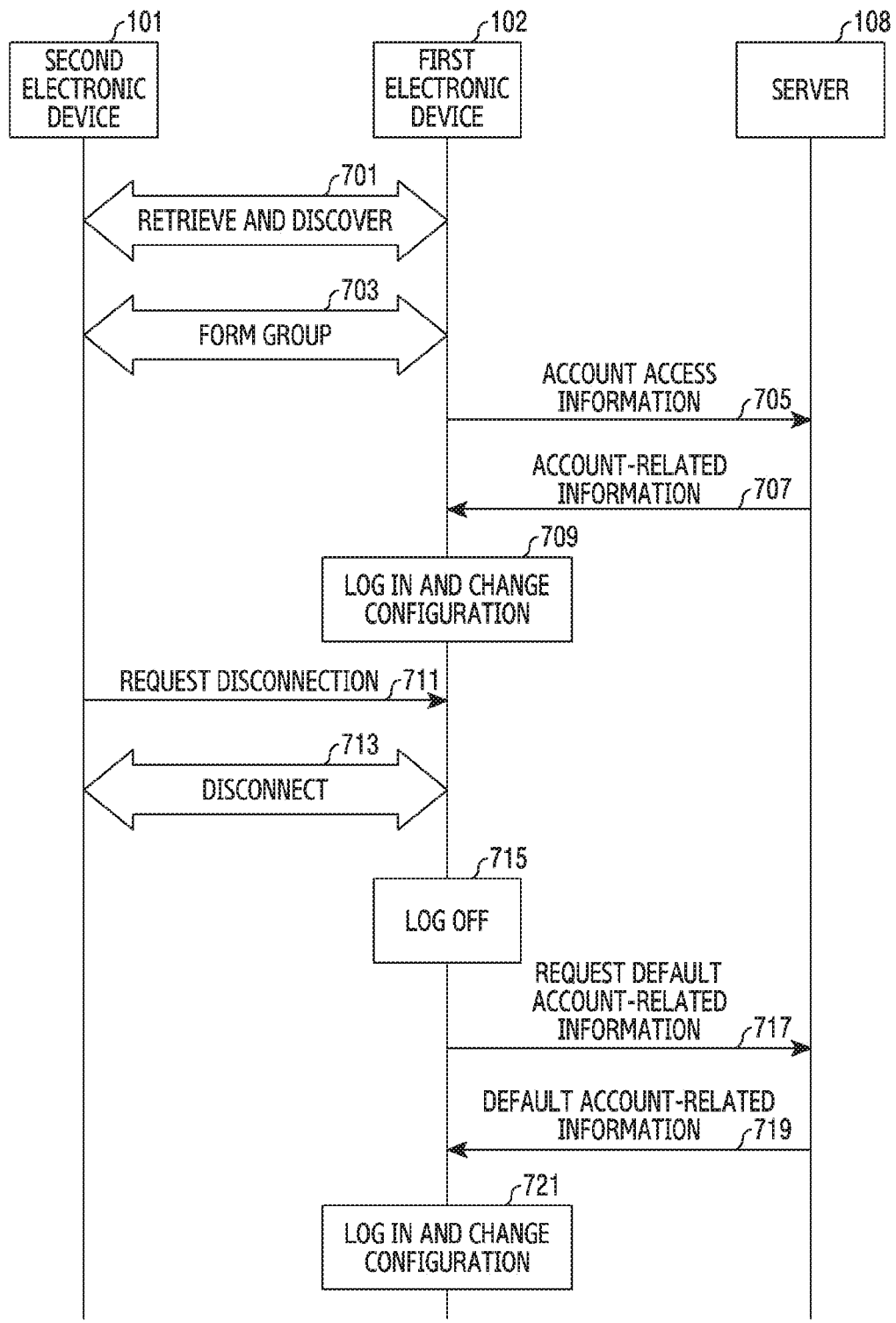
FIG. 7A is a signal exchange diagram illustrating a method for configuring a device based on account-related information, according to an embodiment.

FIG. 7A is a signal exchange diagram illustrating a method for configuring a device based on account-related information, according to an embodiment. FIGS. 7B-7G are diagrams illustrating screens of a first electronic device that configures a device based on account-related information, according to embodiments. FIG. 8 is a diagram illustrating a frame including account access information, according to an embodiment.

The first electronic device 102 and the second electronic device 101 may be connected through a P2P-based short-range communication network. The short-range communication network may be established through Wi-Fi Direct, Wi-Fi Aware, Bluetooth, UWB, NFC, ZigBee, Z-wave, LTE-Direct, FlashLinQ, DataSpotting, or relay-by-smartphone.

The first electronic device 102 and the second electronic device 101 may be connected through a wired connection based on HDMI or USB.

FIG. 7A illustrates a method for configuring the first electronic device 102 based on a device account of the second electronic device 101 when the first electronic device 102 and the second electronic device 102 are P2P-connected using Wi-Fi Direct or Wi-Fi Aware. FIGS. 7B-7G illustrate examples of screens of the first electronic device 102 when a device account of the first electronic device 102 is switched to the device account of the second electronic device 101.

Referring to FIG. 7A, in operation 701, the first electronic device 102 and the second electronic device 101 retrieve and discover each other. Specifically, the first electronic device 102 and the second electronic device 101 may transmit a probe request, and may transmit a probe response upon receiving a probe request. That is, the first electronic device 102 and the second electronic device 101 may retrieve and discover each other by a probe request and a probe response for a Wi-Fi Direct or Wi-Fi Aware connection. The first electronic device 102 and the second electronic device 101 may transmit and receive account access information using some areas of various signals transmitted to and received from each other for a P2P connection using Wi-Fi Direct or Wi-Fi Aware. Account access information about the second electronic device 101 may be transmitted to the first electronic device 102 by a probe request operation and a probe response operation.

Referring to FIG. 8, account access information may be inserted into a vendor-specific ID of a probe request signal and a probe response signal to be transmitted. A frame 800 associated with the account access information includes a MAC header 810, a frame body 820, and a frame check sequence (FCS) 830, and the frame body 820 may include fixed or variable fields. A vendor-specific element field is configured by inserting "221" into an element ID 821 in the variable fields of the frame body 820 and includes the element ID 821, a length 822, an organizationally unique identifier (OUI) 823, and a vendor-specific element 824. A trigger operation for a local connection may be performed by the first electronic device 102 and/or the second electronic device 101.

Referring back to FIG. 7A, in operation 703, the first electronic device 102 and the second electronic device 101 form a group. That is, the first electronic device 102 and the second electronic device 101 may form a group established by a P2P connection through a group owner (GO) negotiation request and a GO negotiation response. The account access information about the second electronic device 101 may be transmitted to the first electronic device 102 by the probe request operation and the probe response operation. The P2P connection using Wi-Fi Direct or Wi-Fi Aware may be an encrypted connection, and an encryption method may be determined through the GO negotiation request and the GO negotiation response between the first electronic device 102 and the second electronic device 101. The second electronic device 101 may encrypt and transmit the account access information about the second electronic device 101 using information about the first electronic device 102 obtained during a network connection process. The account access information may be encrypted by exchanging authentication keys via a server 108.

In operation 705, the first electronic device 102 transmits the account access information to the server 108. In operation 707, the first electronic device 102 receives account-related information from the server 108. The server 108 may receive the account access information from the first electronic device 102 and may transmit the account-related information corresponding to the received account access information to the first electronic device 102. The account access information may include information for obtaining account-related information from the server. The account-related information may be encrypted information. The account access information may include information generated for identifying the account, information for accessing the account, and/or information including at least some of MAC information for specifying the second electronic device 101 and a server address for identifying a registered account of the second electronic device 101 using MAC. The account access information may be referred to as a token, a key, a code, or other terms having an equivalent technical meaning. The account-related information may be information about the device account of the second electronic device 101 and may include a set of information or login information about a plurality of service accounts linked with the device account of the second electronic device 101. The account-related information may be transmitted in an encrypted form. The account-related information may include environmental information about the first electronic device 102. The server 108 may differentially store or manage the plurality of service accounts linked with the device account of the second electronic device 101, and may provide information about the service accounts differentially managed to an external electronic device according to a differential request from the external electronic device. The server 108 may separately manage a set of service accounts requiring additional authentication and a set of service accounts not requiring additional authentication. The server 108 may receive and store configuration information about the first electronic device 102 or information about an application installed in the first electronic device 102, which is linked to the account, and may provide the stored configuration information about the first electronic device 102 or information about the application installed in the first electronic device 102 by request from the first electronic device 102.

When the first electronic device 102 receives an authentication key from the second electronic device 101 and requests authentication of the authentication key from the server 108, the server 108 may transmit account-related information linked with the authentication key to the first electronic device 102. The first electronic device 102 may receive the encrypted account-related information directly from the second electronic device 101, may decode the encrypted information through the server 108, and may log in the device account of the second electronic device 101 on the basis of the decoded information. The first electronic device 102 may receive unique identification information, such as a MAC address, of the second electronic device 101 from the second electronic device 101 and may receive account-related information linked to the unique identification information from the server 108 using the received unique identification information.

In operation 709, the first electronic device 102 logs in based on the account-related information and changes the configuration of the first electronic device 102. The first electronic device 102 may switch an existing device account of the first electronic device 102 to the device account of the second electronic device 101 based on the account-related information.

Figure 7B:
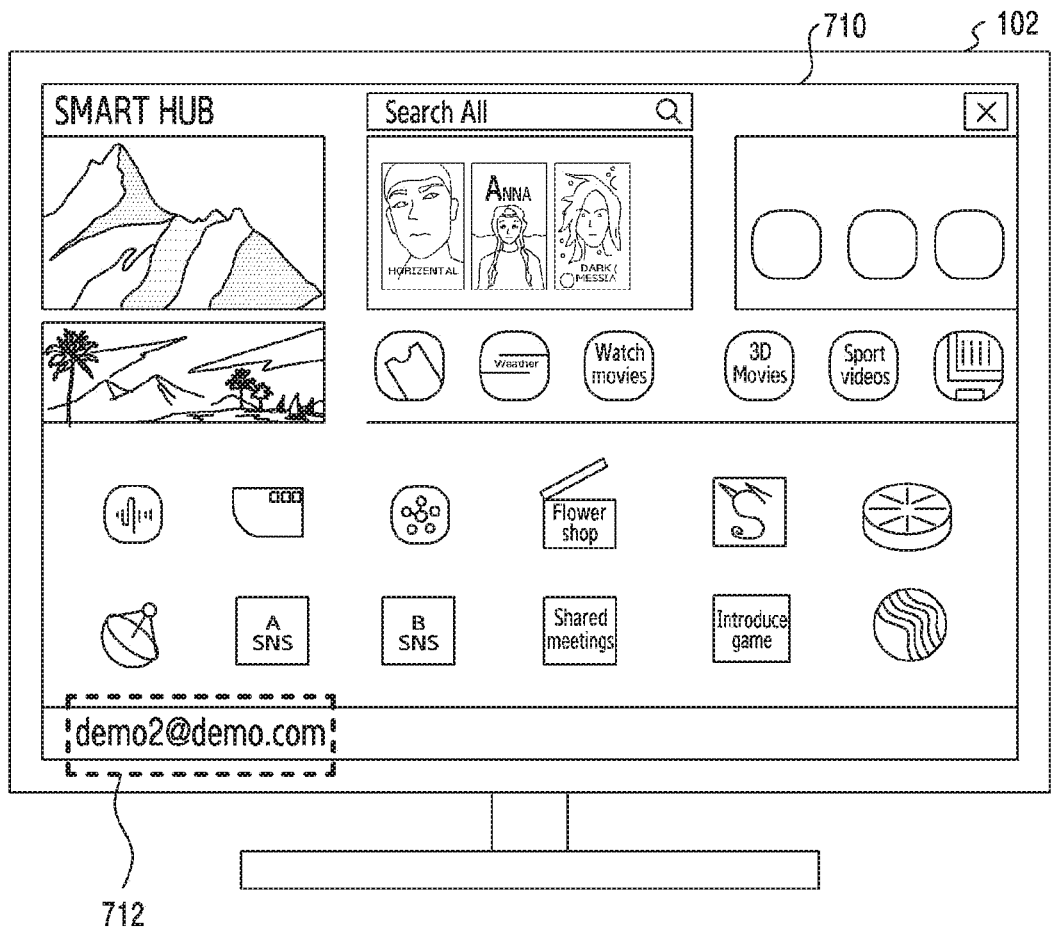
FIGS. 7B-7G are diagrams illustrating screens of a first electronic device that configures a device based on account-related information, according to embodiments.
Figure 8:
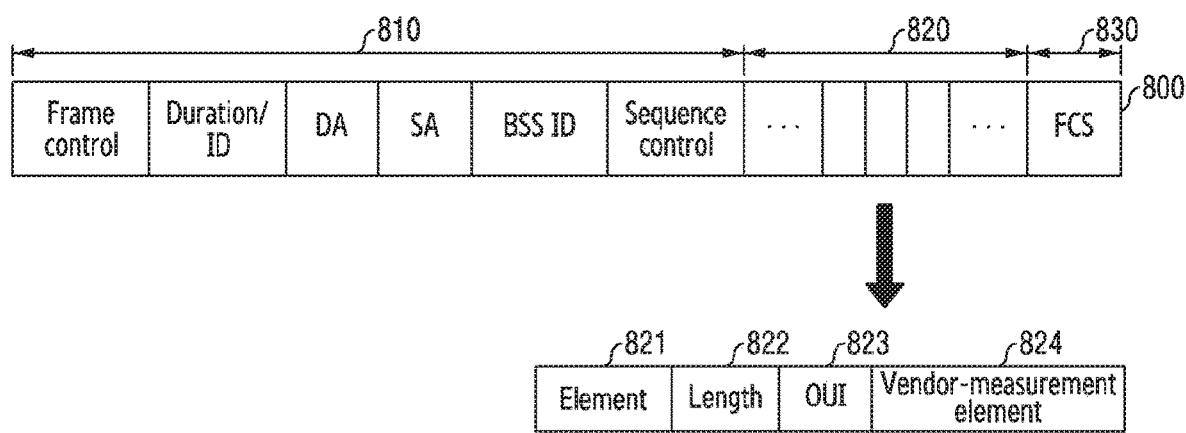
FIG. 8 is a diagram illustrating a frame including account access information, according to an embodiment.

Referring to FIG. 7B, the first electronic device 102 displays switched account information 712 on a portion of a screen 710, for example, the bottom left. The first electronic device 102 may log in to a service corresponding to each of the plurality of service accounts linked with the device account of the second electronic device 101 using each account based on the account-related information.

Figure 7C:
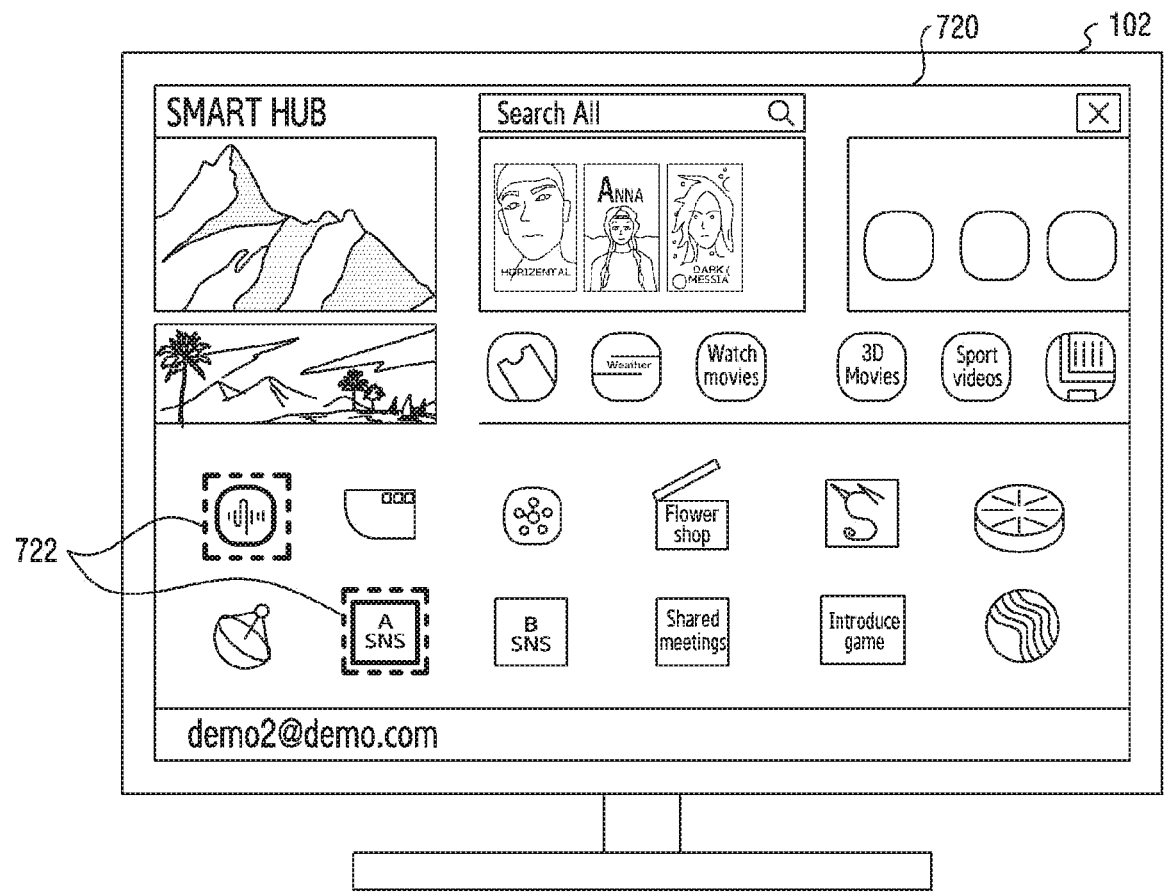

Referring to FIG. 7C, the first electronic device 102 displays at least one application 722 having login information changed on the switched account to be distinguished from at least one unchanged application on a screen 720. The first electronic device 102 displays the at least one application having the login information changed to be distinguished from the at least one unchanged application by changing the color, icon, text, or boundary color and/or shading.

Figure 7D:
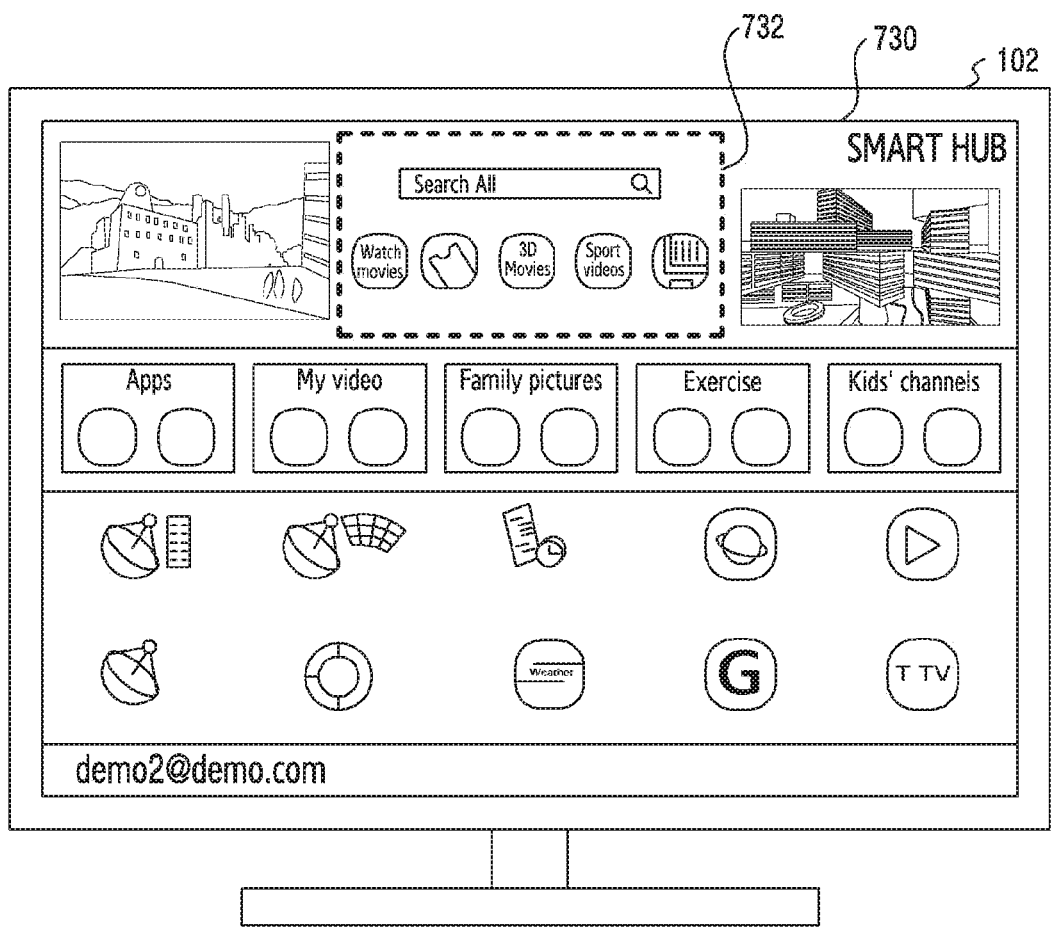

Referring to FIG. 7D, the first electronic device 102 groups and displays at least one application 723 having login information changed on the switched account on a portion of a screen 730, for example, in the upper center. The first electronic device 102 may temporarily change the configuration of the first electronic device 102 based on the environmental information included in the account-related information about the second electronic device 101. When the first electronic device 102 is a TV, the first electronic device 102 may change a sound field configuration (e.g., equalizer manipulation or 3D sound field effect), parental control, adult authentication, and/or a payment-related configuration on the basis of the environmental information. The configuration and arrangement of channels of the first electronic device 102 may vary depending on each local cable operator. Cable operator B in region A may provide HBO on channel 131, while cable operator C in region B may provide HBO on channel 221.

Figure 7E:
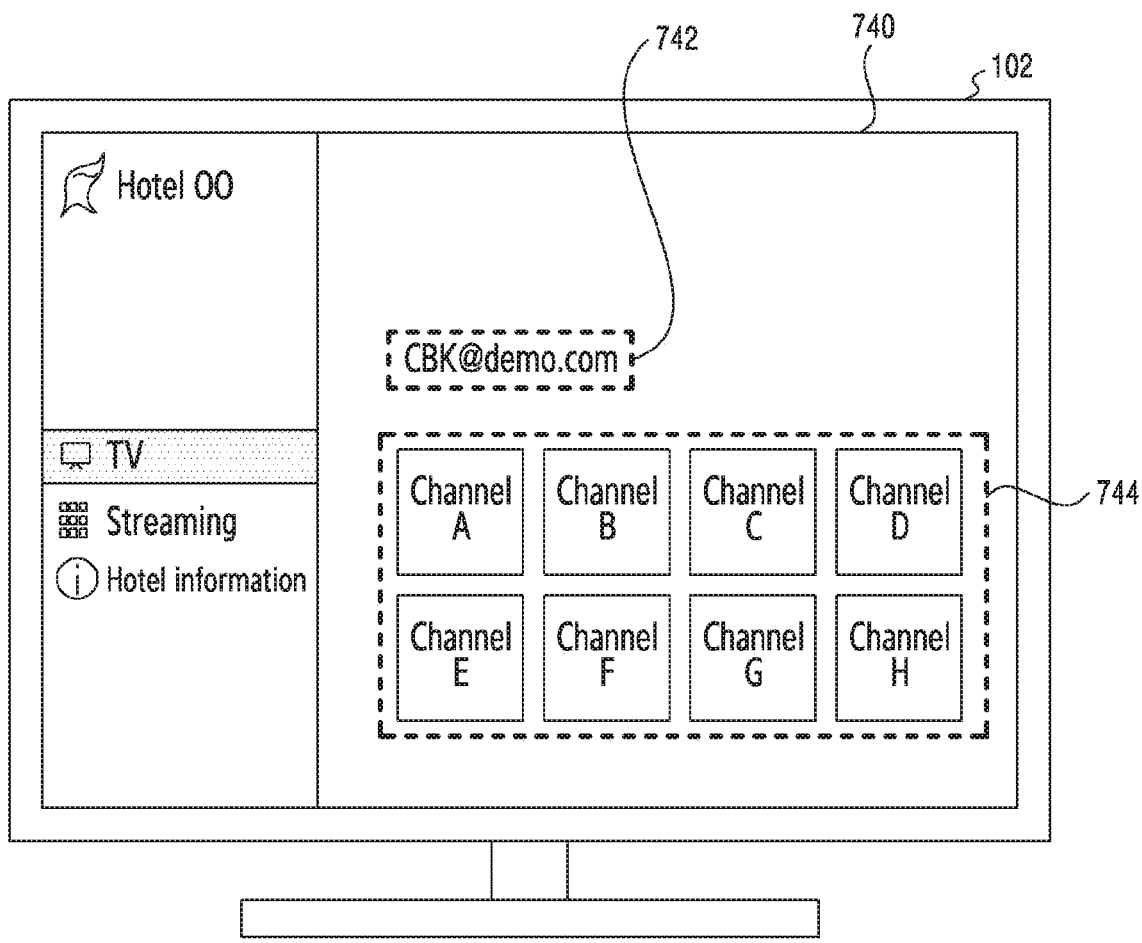

The first electronic device 102 may change information on a preferred channel set by a user based on a service configuration of each region or each local operator. Referring to FIG. 7E, the first electronic device 102 displays a switched device account 742 of the second electronic device 101 in a portion of a screen 740 (e.g., in a middle right portion), and may display changed preferred channels 744 in a second area (e.g., at the right bottom) of the screen 740 of the first electronic device 102.

Figure 7F:
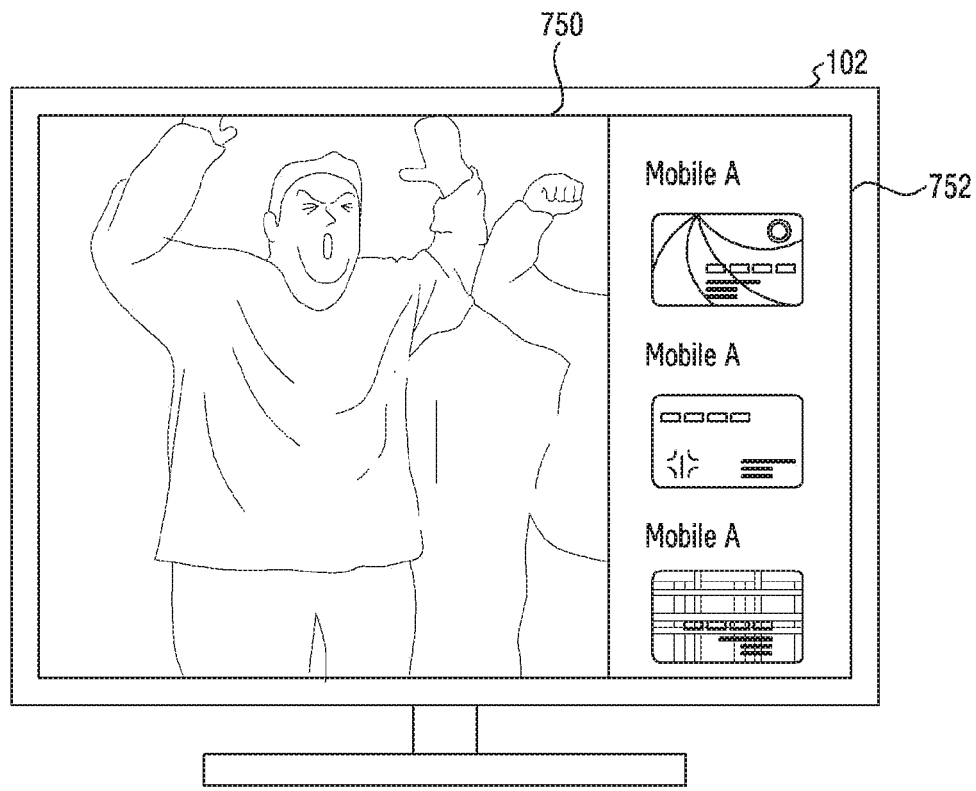
Figure 7F:
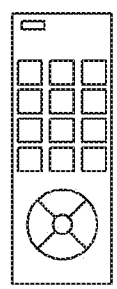

The user of the second electronic device 101 maintaining the P2P connection with the first electronic device 102 may make a payment for product purchase using only an interface of the first electronic device 102. Referring to FIG. 7F, the first electronic device 102 switches to the account of the second electronic device 101 and displays an interface 750 of the first electronic device 102 including payment method information 752 for payment with the account of the second electronic device 101 on the display 340 of the first electronic device 102. The user may make a payment for product purchase with the account of the second electronic device 101 using the interface 750 of the first electronic device 102.

Figure 7G:
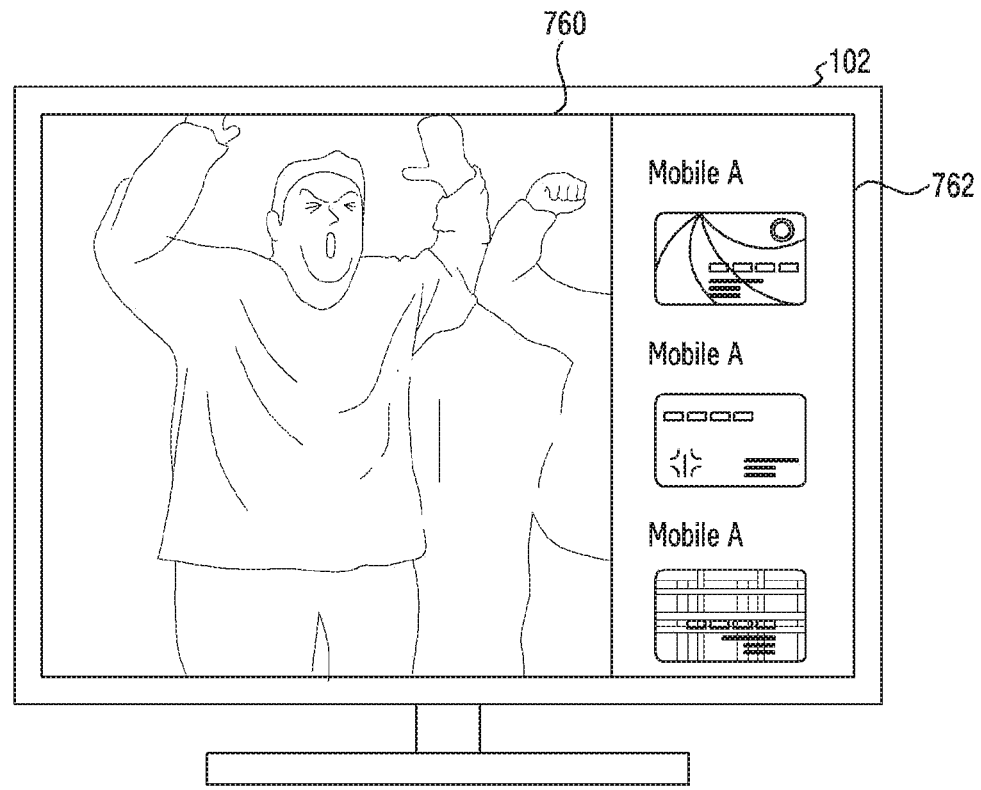
Figure 7G:
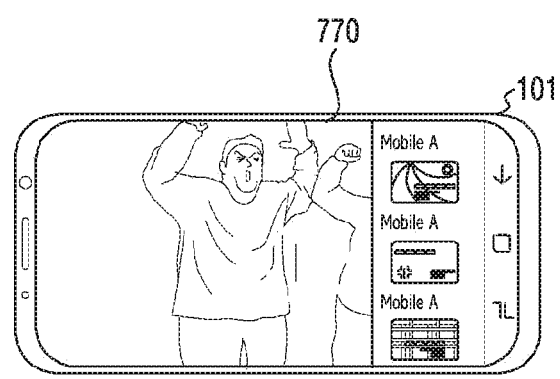

Referring to FIG. 7G, the first electronic device 102 switches to the account of the second electronic device 101 and displays an interface 760 of the first electronic device 102 including payment method information 762 for payment with the account of the second electronic device 101 on the display 340 of the first electronic device 102. The second electronic device 101 displays the same interface 770 as the interface 760 of the first electronic device 102 on a display device 160 of the second electronic device 101. The user may make a payment for product purchase with the account of the second electronic device 101 through an interaction between the first electronic device 102 and the second electronic device 101.

When the first electronic device 102 is an in-vehicle electronic device, if the first electronic device 102 switches to the device account of the second electronic device 101, various functions of a vehicle may be changed, and information collected while driving and using the vehicle may be stored as information generated by the user. The first electronic device 102 may change attributes and forms of an entertainment system of the vehicle and the configuration of the vehicle (e.g., the height of a steering wheel, a seat position, brake sensitivity, or the configuration of a navigation system) based on the device account of the second electronic device 101. The first electronic device 102 may also change a digital cockpit provided by an electronic display embedded in the vehicle or a user interface included in a display on a dashboard based on the device account of the second electronic device 101.

The server 108 may receive and store in advance the configuration information about the first electronic device 102 or the information about the application installed in the first electronic device 102 and may provide the stored configuration information about the first electronic device 102 or information about the application installed in the first electronic device 102 by request from the first electronic device 102 in order to restore the device account of the first electronic device 102.

The second electronic device 101 may be connected with the first electronic device 102 via a network and may operate as an input device of the first electronic device 102. When text input to the first electronic device 102 is required, the first electronic device 102 may receive state information (e.g., distance information, received signal strength indication (RSSI), and/or connection with the device account of the first electronic device 102) about a plurality of neighboring electronic devices and may determine an optimal electronic device on the basis of the received state information. The user may input text to the first electronic device 102 using the determined optimal electronic device.

After switching the device account of the first electronic device 102 to the device account of the second electronic device 101, the first electronic device 102 may display a message (e.g., a text message or a short message service (SMS) message) received by the second electronic device 101 on the display unit 340 of the first electronic device 102. The first electronic device 102 may display a call received by the second electronic device 101 on the display unit 340 of the first electronic device 102 and may answer or block the call received by the second electronic device 101 according to a user input to the first electronic device 102.

After switching the device account of the first electronic device 102 to the device account of the second electronic device 101, user input information input through the first electronic device 102 or information generated through the first electronic device 102 is stored in the server as account-related information about the device account of the second electronic device 101. In various electronic devices registered with the device account of the second electronic device 101, the account-related information about the device account of the second electronic device 101 may be utilized. User input information input through various electronic devices having switched to the device account of the second electronic device 101 or information generated through the various electronic devices may be accumulated as personalized information and may be used for an artificial intelligence service.

Referring back to FIG. 7A, in operation 711, the second electronic device 101 transmits a disconnection request message to the first electronic device 102. The second electronic device 101 may transmit the disconnection request message to the first electronic device 102 randomly by the user. When the strength of a communication signal between the first electronic device 102 and the second electronic device 101 is determined to be a predetermined strength or less, the second electronic device 101 may transmit the disconnection request message to the first electronic device 102.

In operation 713, the first electronic device 102 and the second electronic device 101 release the P2P connection between the first electronic device 102 and the second electronic device 101 in response to the connection release request. The P2P connection may be released when the strength of the communication signal between the first electronic device 102 and the second electronic device 101 is determined to be the predetermined strength or less or when the first electronic device 102 or the second electronic device 101 is powered off.

In operation 715, the first electronic device 102 logs off the device account of the second electronic device 101. The first electronic device 102 may log off the device account of the second electronic device 101 and may simultaneously log off the plurality of service accounts linked with the device account of the second electronic device 101.

In operation 717, the first electronic device 102 transmits a request for default account-related information to the server 108. Upon logging off the device account of the second electronic device 101, the first electronic device 102 may transmit a message requesting the default account-related information to the server 108. The request for the default account-related information may be for obtaining a token, a key value, a code, unique device information, such as MAC information about the first electronic device 102, or default account-related information, and/or a server address. The first electronic device 102 may log off the device account of the second electronic device 101 (operation 715) and may simultaneously transmit the request for the default account-related information to the server 108 (operation 717).

In operation 719, the server 108 transmits the default account-related information to the first electronic device 102. The default account-related information may be information about the device account of the first electronic device 102 and may include a set of information or login information about a plurality of service accounts linked with the device account of the first electronic device 102. The default account-related information may include the environmental information about the first electronic device 102.

In operation 721, the first electronic device 102 logs in base on the default account-related information and changes the configuration of the first electronic device 102. The first electronic device 102 may log in with the existing device account of the first electronic device 102 based on the default account-related information. The first electronic device 102 may log in to a service corresponding to each of the plurality of service accounts linked with the existing device account of the first electronic device 102 using each account based on the default account-related information. The first electronic device 102 may change the configuration of the first electronic device 102 based on the environmental information included in the default account-related information.

When the first electronic device 102 includes two physical communication means, such as, for example, a real simultaneous dual band (RSDB), a first Wi-Fi communication module may provide legacy Wi-Fi, and a second Wi-Fi communication module may be used to perform P2P communication.

The first electronic device 102 may maintain one or more P2Ps time-divisionally or simultaneously. The first electronic device 102 may receive the account access information from the second electronic device 101 through a first P2P network, and may simultaneously or time-divisionally exchange P2P files with the second electronic device 101 or a third electronic device through a second P2P network or may connect to an external network through legacy Wi-Fi.

Operation 717 and operation 719 may be omitted, and the first electronic device 102 may store the device account of the first electronic device 102, the information about the plurality of service accounts linked with the device account of the first electronic device 102, and the environmental information about the first electronic device 102 in a memory having areas physically or logically divided for security. The first electronic device 102 may load the device account of the first electronic device 102, the information about the plurality of service accounts linked with the device account of the first electronic device 102, and the environmental information about the first electronic device 102 back from the memory when logging off the device account of the second electronic device 101.

The first electronic device 102 may maintain a login state using the device account of the second electronic device 101 only through non-connection broadcasting instead of a local connection. When receiving a heartbeat broadcasting signal, such as, for example, a predetermined signal pattern, from the second electronic device 101, the first electronic device 102 may maintain the login state using the device account of the second electronic device 101. When not receiving the heartbeat broadcasting signal, the first electronic device 102 may log off the logged-in device account of the second electronic device 101. Alternatively, the first electronic device 102 may form one communication cluster with the second electronic device 101 using Wi-Fi Aware. The first electronic device 102 may maintain the login state using the device account of the second electronic device 101 when periodically receiving a prearranged signal transmitted by the second electronic device 101 at a time prearranged between the two devices in order to maintain the communication cluster with the second electronic device 101. A prearranged signal periodically transmitted at a predetermined time interval to maintain a communication cluster may be transmitted by one of electronic devices participating in the cluster, and the first electronic device 102 or the second electronic device 101 may be a device transmitting the prearranged signal or a device receiving a prearranged signal.

Figure 9:
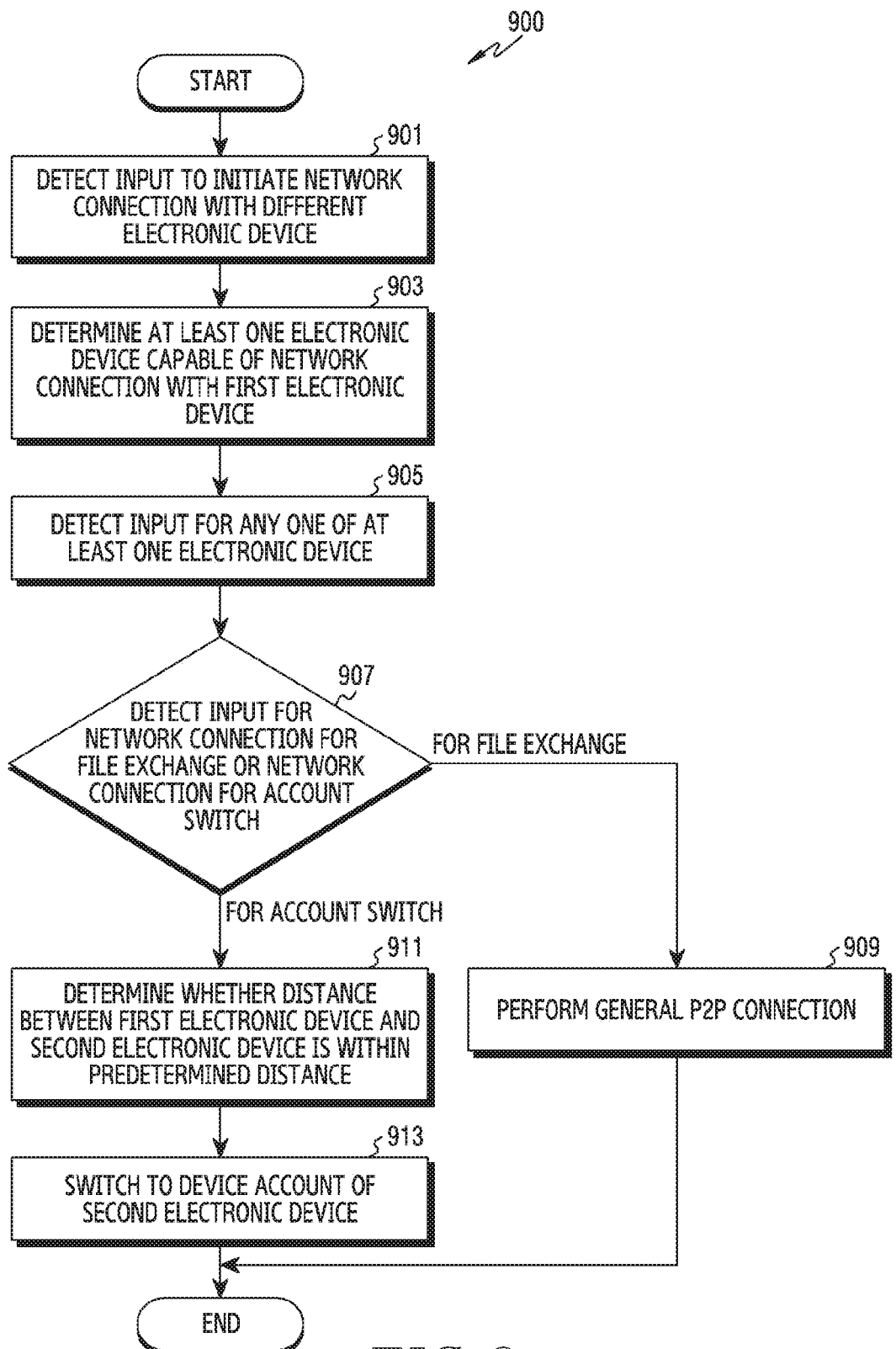
FIG. 9 is a flowchart illustrating a method for connecting to a network to configure a device based on account-related information; according to an embodiment.

FIG. 9 is a flowchart illustrating an operating method of a first electronic device that connects to a network to configure a device based on account-related information, according to an embodiment of the disclosure. The subject of operations in a flowchart 900 of FIG. 9 may be understood as the first electronic device 102 or a component (e.g., the processor 310) of the first electronic device 102.

Referring to FIG. 9, in operation 901, the first electronic device 102 detects an input to initiate a network connection with another electronic device. The first electronic device 102 may display an object related to the network connection on a display 340 of the first electronic device 102. The first electronic device 102 may detect a user input to the displayed object.

In operation 903, the first electronic device 102 determines at least one electronic device capable of the network connection with the first electronic device 102 among a plurality of electronic devices. The first electronic device 102 may measure the RSSI of signals received from the plurality of electronic devices. The signals received from the plurality of electronic devices may be signals received during the network connection (e.g., P2P connection). The first electronic device 102 may determine at least one electronic device capable of the network connection among the plurality of electronic devices based on the measured RSSI. The first electronic device 102 may determine at least one electronic device having a measured RSSI value greater than a predetermined threshold value among the plurality of electronic devices. The first electronic device 102 may measure proximity to the plurality of electronic devices based on multi-path patterns of the plurality of electronic devices, and may determine at least one electronic device capable of the network connection among the plurality of electronic devices based on the measured proximity.

In operation 905, the first electronic device 102 detects an input for any one of the at least one electronic device capable of the network connection. The first electronic device 102 may display at least one object associated with the at least one electronic device capable of the network connection on the display unit 340 of the first electronic device 102. When the first electronic device 102 detects a user input to the displayed object, any one of the at least one electronic device capable of the network connection may be selected. The electronic device selected from among the at least one electronic device capable of the network connection may be a second electronic device 101.

In operation 907, the first electronic device 102 detects an input for a network connection for file exchange or a network connection for account switch to the second electronic device 101. The network connection for file exchange may be a general P2P connection, and the network connection for account switch may be a P2P connection for switching to a device account of the second electronic device 101. The first electronic device 102 may display an object associated with the network connection for file exchange and/or an object associated with the network connection for account switch on the display unit 340 of the first electronic device 102. The first electronic device 102 may detect a user input to the displayed object.

When an input for the network connection for file exchange is detected, the first electronic device 102 performs the general P2P connection with the second electronic device 101, in operation 909.

When an input for the network connection for account switch is detected, the first electronic device 102 determines whether the distance between the first electronic device 102 and the second electronic device 101 is within a predetermined distance via a short-range network, in operation 911. The short-range network may be a UWB. Additionally, the first electronic device 102 and the second electronic device 101 may identify the distance between the two electronic devices using UWB ranging.

When the distance between the first electronic device 102 and the second electronic device 101 is determined to be within the predetermined distance through the UWB, the first electronic device 102 switches to the device account of the second electronic device 101, in operation 913. When the distance between the first electronic device 102 and the second electronic device 101 is determined not to be within the predetermined distance through the UWB, the first electronic device 102 terminates this procedure. The first electronic device 102 may receive account access information, network connection information, and/or electronic device information during a UWB ranging process, or may receive account access information, network connection information, and/or electronic device information during a UWB connection process after the UWB ranging process.

The first electronic device 102 may identify whether the second electronic device 101 is positioned at a certain distance and at a certain angle using a real-time location service (RTLS) of the UWB, and may switch to the device account of the second electronic device 101 when the second electronic device 101 is positioned at the certain distance and at the certain angle.

With a plurality of accounts registered in the first electronic device 102, when the second electronic device 101 registered with one of the plurality of accounts approaches the first electronic device 102, the first electronic device 102 may establish a UWB connection with the second electronic device 101 using UWB ranging. Subsequently, the first electronic device 102 may switch a device account of the first electronic device 102 to the device account of the second electronic device 101.

With a plurality of accounts registered in the first electronic device 102, when the second electronic device 101 registered with one of the plurality of accounts approaches the first electronic device 102, the first electronic device 102 may identify distance and/or device information using UWB ranging and may connect to the second electronic device 101 by Wi-Fi or Bluetooth. Subsequently, the first electronic device 102 may switch a device account of the first electronic device 102 to the device account of the second electronic device 101.

It is possible to determine proximity using short-range communication methods, such as, for example, BT/BLE and Wi-Fi, other than the UWB technology.

Figure 10:
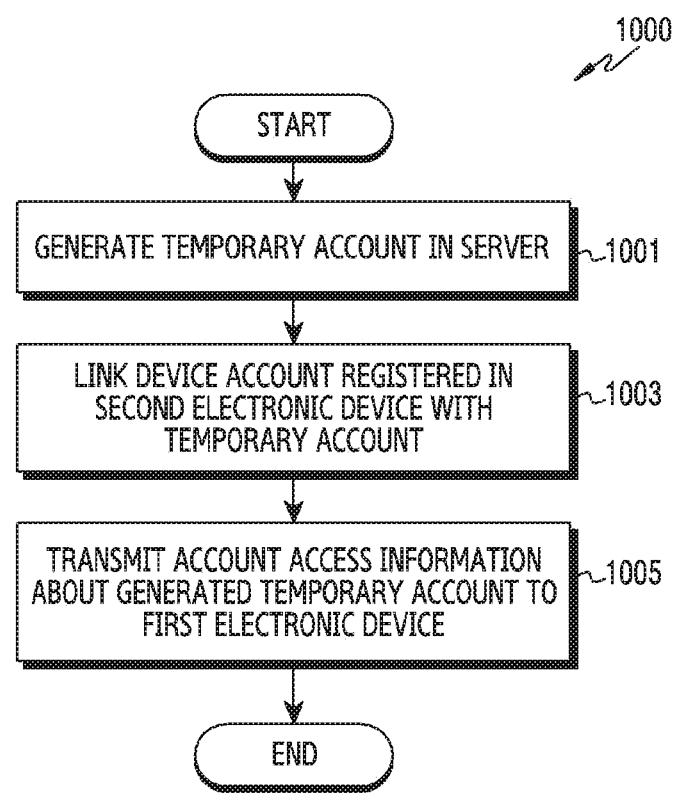
FIG. 10 is a flowchart illustrating a method for using a temporary account to configure a device based on account-related information, according to an embodiment.

FIG. 10 is a flowchart illustrating a method for using a temporary account to configure a device based on account-related information, according to an embodiment. The subject of operations in a flowchart 1000 of FIG. 10 may be understood as the second electronic device 101 or a component (e.g., the processor 120) of the second electronic device 101.

The second electronic device 101 may generate a temporary account, rather than directly transmitting account access information about a device account of the second electronic device 101 to a first electronic device 102. The second electronic device 101 may link the temporary account with the device account of the second electronic device 101 and may transmit account access information about the temporary account to the first electronic device 102.

Referring to FIG. 10, in operation 1001, the second electronic device 101 generates the temporary account in the server 108. That is, the second electronic device 101 may generate the temporary account related to the device account of the second electronic device 101 in the server 108 in order to protect the device account of the second electronic device 101. The temporary account may set the validity period of or right to the temporary account according to a policy of the server 108 or user selection. A user may set a device allowed to access the temporary account related to the device account of the second electronic device 101, and may set the temporary account to be removed when the first electronic device 102 logs off the device account of the second electronic device 101.

In operation 1003, the second electronic device 101 links a device account registered in the second electronic device 101 with the temporary account generated in the server 108. The second electronic device 101 may store at least part of information about the device account of the second electronic device 101 in the generated temporary account in order to link the registered device account with the temporary account. The server 108 may link the device account of the second electronic device 101 with the generated temporary account.

In operation 1005, the second electronic device 101 transmits the account access information about the generated temporary account to the first electronic device 102. The account access information may include information generated for identifying the temporary account, information for accessing the temporary account, and/or information including at least some of MAC information for specifying the second electronic device 101 and a server address for identifying a registered account of the second electronic device 101 using MAC. The account access information may be referred to as a token, a key, a code, or other terms having an equivalent technical meaning. The first electronic device 102 may delete the generated temporary account when logging off the device account of the second electronic device 101.

Figure 11:
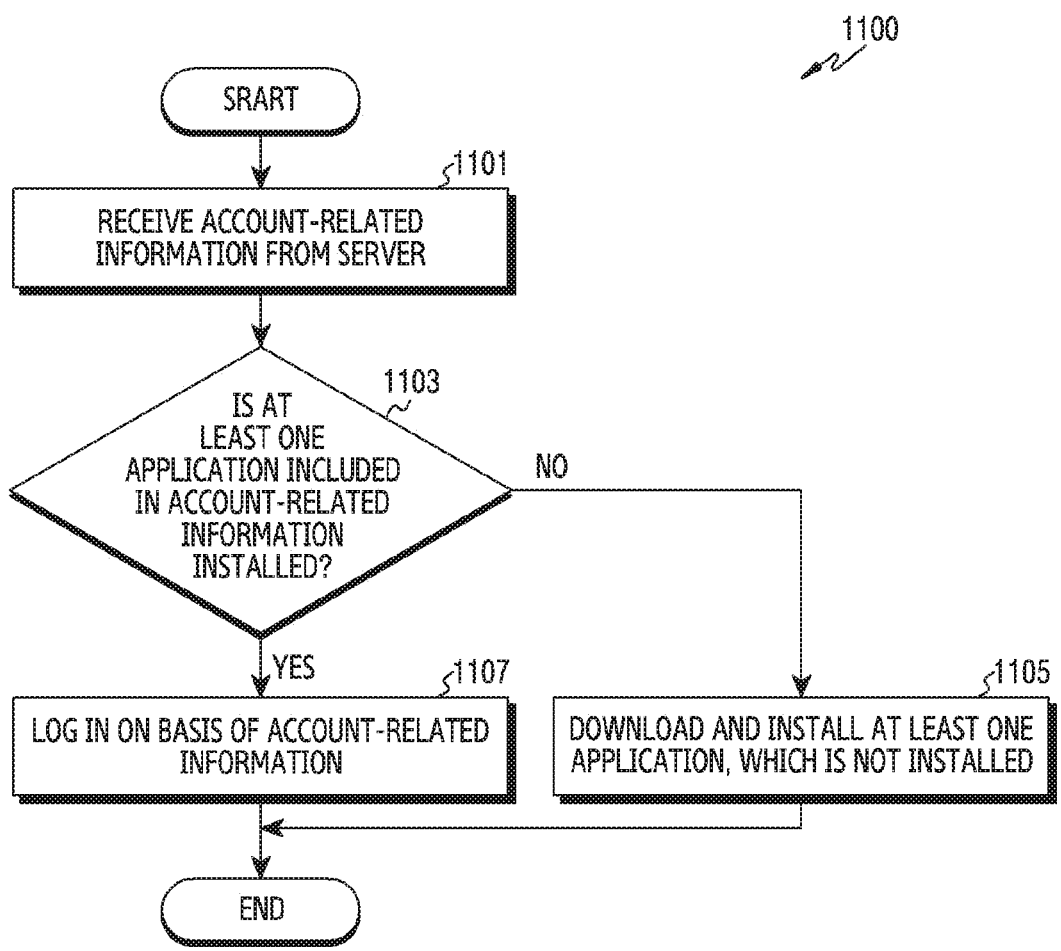
FIG. 11 is a flowchart illustrating a method for configuring a device based on account-related information, according to an embodiment.

FIG. 11 is a flowchart illustrating a method for configuring a device based on account-related information, according to an embodiment. The subject of operations in a flowchart 1100 of FIG. 11 may be understood as the first electronic device 102 or a component (e.g., the processor 310) of the first electronic device 102.

Referring to FIG. 11, in operation 1101, the first electronic device 102 receives account-related information from a server 108. That is, the first electronic device 102 may transmit account access information, received from a second electronic device 101, to the server 108, and may receive account-related information corresponding to the account access information from the server 108.

In operation 1103, the first electronic device 102 identifies whether at least one application included in the received account-related information is installed in the first electronic device 102. The first electronic device 102 may receive information (e.g., an application list) about at least one application corresponding to at least one service linked with a device account of the second electronic device 101, and may identify whether the application included in the received information is installed in the first electronic device 102.

When the at least one application corresponding to the at least one service linked with the device account of the second electronic device 101 is not installed, the first electronic device 102 downloads and installs the at least one application, which is not installed, in operation 1105. That is, the first electronic device 102 may retrieve the at least one application, which is not installed, from a corresponding service server, and may download and install the retrieved at least one application.

In operation 1107, the first electronic device 102 logs in based on the account-related information. The first electronic device 102 may log in a specific website or a specific application based on the account-related information about the second electronic device 101. After logging into the specific website or the specific application, the first electronic device 102 may change a configuration for the specific website or the specific application on the basis of the account-related information.

Figure 12:
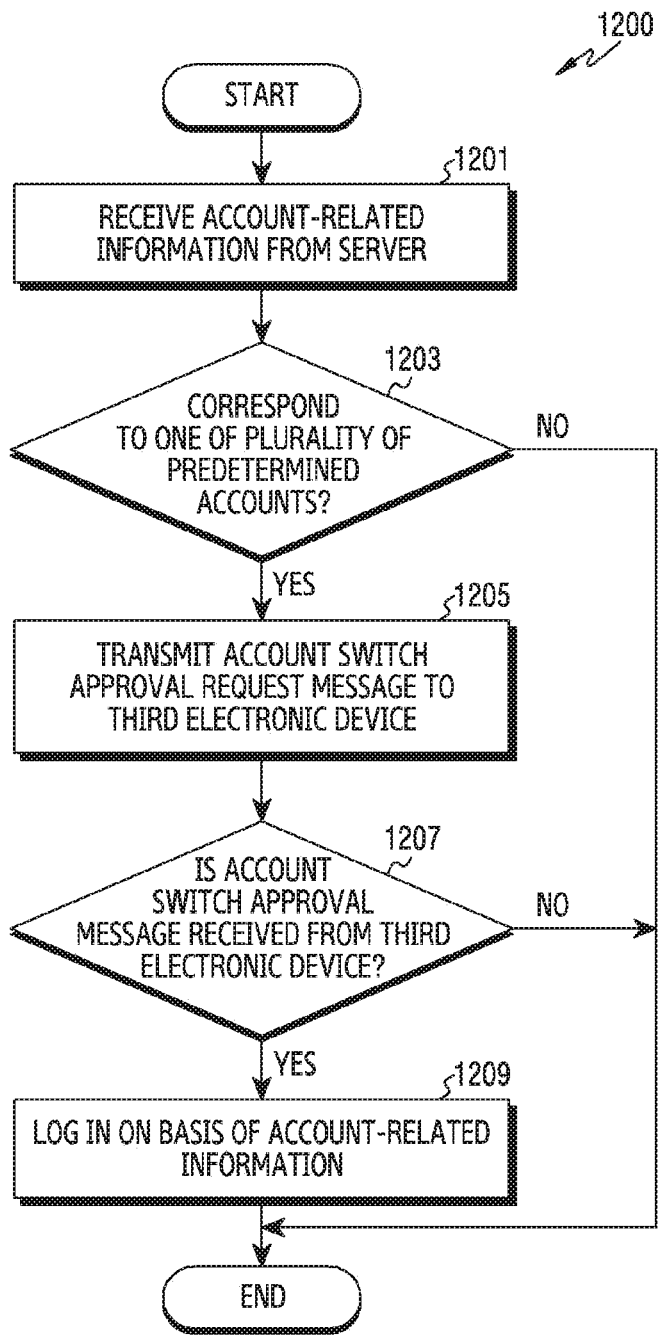
FIG. 12 is a flowchart illustrating an operating method of a first electronic device that configures a device based on account-related information, according to an embodiment.

FIG. 12 is a flowchart illustrating an operating method of a first electronic device that configures a device based on account-related information, according to an embodiment. The subject of operations in a flowchart 1200 of FIG. 12 may be understood as the first electronic device 102 or a component (e.g., the processor 310) of the first electronic device 102.

Referring to FIG. 12, in operation 1201, the first electronic device 102 receives account-related information from a server 108. The first electronic device 102 may transmit account access information, received from a second electronic device 101, to the server 108, and may receive account-related information corresponding to the account access information from the server 108.

In operation 1203, the first electronic device 102 determines whether the received account-related information corresponds to one of a plurality of accounts previously stored in the first electronic device. The first electronic device 102 may determine whether a device account of the second electronic device 101 indicated by the received account-related information matches one of the plurality of previously stored accounts.

When the device account of the second electronic device 101 matches one of the plurality of previously stored accounts, the first electronic device 102 transmits an account switch approval request message to a third electronic device registered in the server with the same account as that of the first electronic device, in operation 1205.

When the device account of the second electronic device 101 does not match any one of the plurality of previously stored accounts, this procedure is terminated.

The third electronic device may be a device corresponding to one of a plurality of accounts previously stored in the first electronic device 102. The first electronic device 102 may transmit the account switch approval request message to the third electronic device through the server 108. When the third electronic device is a mobile terminal, it may be displayed whether a request is approved through a pop-up window of a screen of the mobile terminal.

In operation 1207, the first electronic device 102 determines whether an account switch approval message is received from the third electronic device. When the third electronic device receives the account switch approval request message from the first electronic device 102, the third electronic device may display a notification screen for determining whether to approve an account switch on a screen of the third device. The third electronic device may transmit an account switch approval message to the first electronic device 102 through the server in response to an input to approve the account switch. The third electronic device may preset a device account to which the account switch is approved. Alternatively, the server may dynamically specify a device account by determining a device currently being used or carried by a user.

In operation 1209, the first electronic device 102 logs in based on the account-related information. That is, the first electronic device 102 may switch to the device account of the second electronic device 101 based on the account switch approval message received from the third electronic device.

Approval for an account switch request may configured such that an account switch approval request is notified to the third electronic device when the third electronic device is positioned near the first electronic device 102, and an account switch is performed without notification to or approval by the third electronic device when the third electronic device is not positioned near the first electronic device 102. It may be determined whether the third electronic device is in proximity to the first electronic device 102 using a GPS, through a sound signal, a visible light signal, the signal strength of a local network, such as Bluetooth Low Energy (BLE), Bluetooth, ZigBee, or Z-wave, or depending on whether the third electronic device is connected to the same Wi-Fi network as the first electronic device 102.

An operating method of an electronic device for configuring a device based on account-related information may include receiving account access information from a different electronic device; transmitting the account access information to a server; receiving account-related information about the different electronic device from the server; and logging into an account of the different electronic device on the basis of the account-related information and changing a configuration of the electronic device.

The method may include receiving, from the server, at least one of information about at least one service account linked with the account of the different electronic device, information about at least one application installed with the account of the different electronic device, and environmental information about the electronic device when logging into the account of the different electronic device.

Receiving of the account access information from the different electronic device may include displaying a first interface including a first object for connecting with the different electronic device; requesting an account switch from the different electronic device upon detecting an input to the first object; and receiving the account access information from the different electronic device upon requesting the account switch from the different electronic device.

Figure 13A:
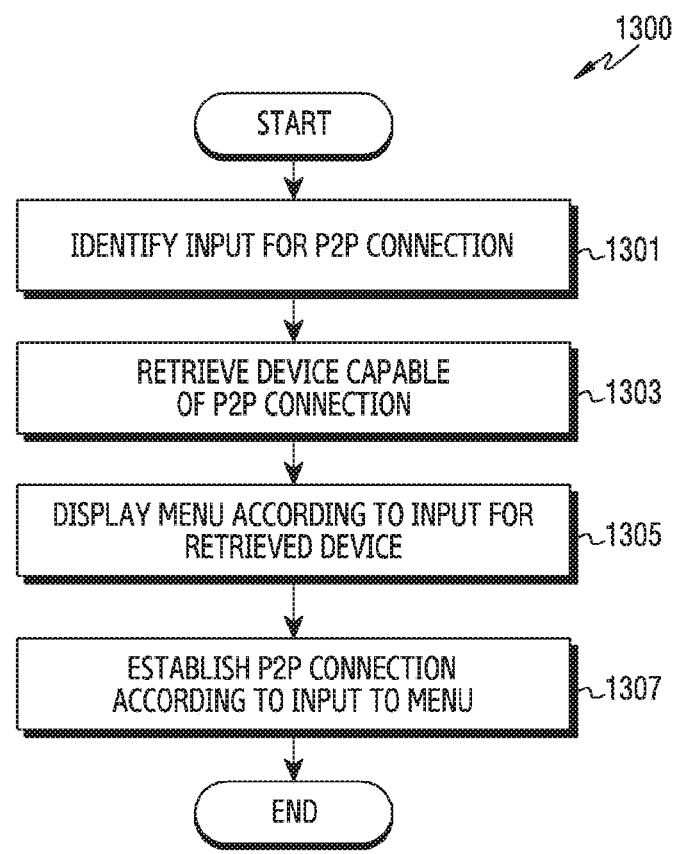
FIG. 13A is a flowchart illustrating an operating method of a second electronic device that configures a device based on account-related information, according to an embodiment.

FIG. 13A is a flowchart illustrating an operating method of a second electronic device that configures a device based on account-related information, according to an embodiment. FIG. 13B-13H are diagrams illustrating screens of a second electronic device that configures a device based on account-related information, according to embodiments. The subject of operations in a flowchart 1300 of FIG. 13A may be understood as the second electronic device 101 or a component (e.g., the processor 120) of the second electronic device 101. FIG. 13B to FIG. 13H illustrate specific examples of screens of the second electronic device 101 when an account of the first electronic device 102 is switched by the second electronic device 101.

The second electronic device 101 may identify configuration information about the first electronic device 102 in a network connection operation, and may display an input window for service selection on a screen of the second electronic device 101 to induce a user's selection when the first electronic device 102 supports exchanging account access information. When the first electronic device 102 does not support exchanging account access information, the second electronic device 101 may provide a general P2P file exchange service.

Figure 13B:
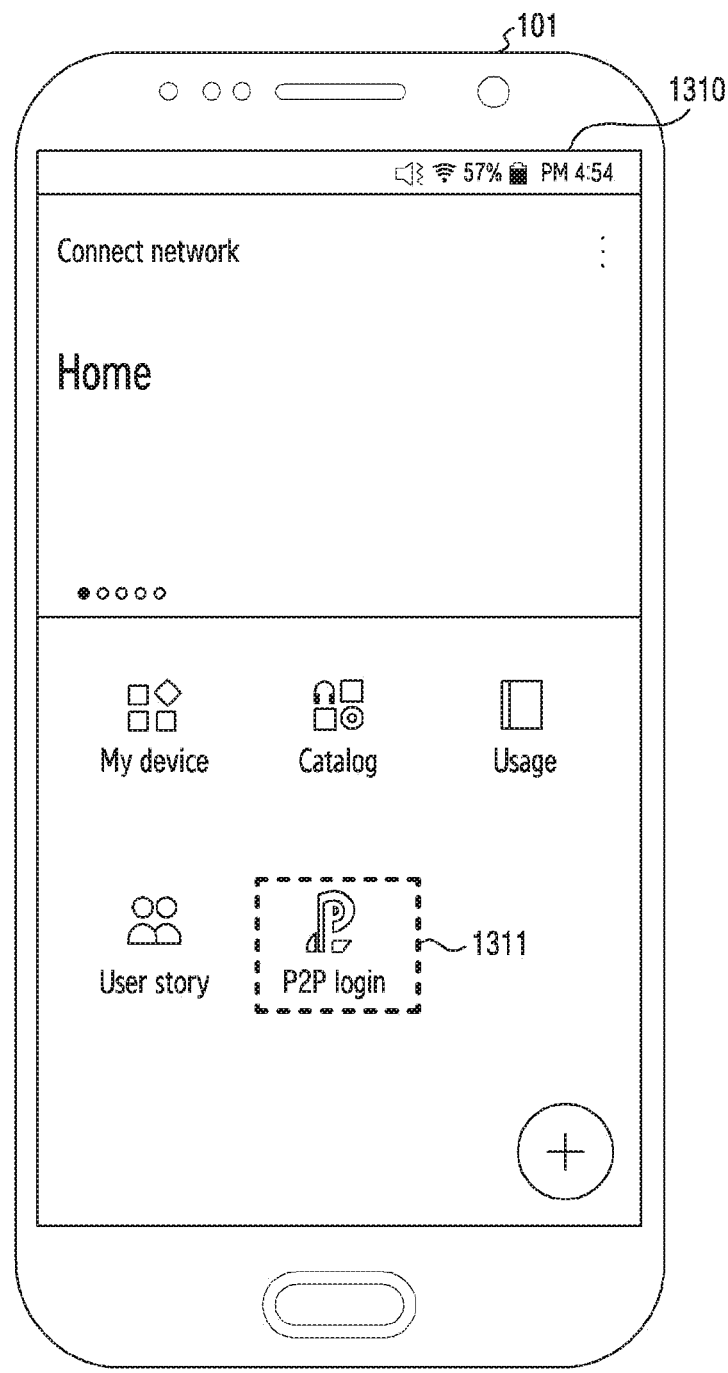
FIGS. 13B-13H are diagrams illustrating screens of a second electronic device that configures a device based on account-related information, according to embodiments.

Referring to FIG. 13A, in operation 1301, the second electronic device 101 displays a screen for performing a P2P connection with the first electronic device 102. Referring to FIG. 13B, the second electronic device 101 displays a screen 1310 of a general menu on the display device 160, and the user may select a P2P login menu 1311.

Figure 13C:
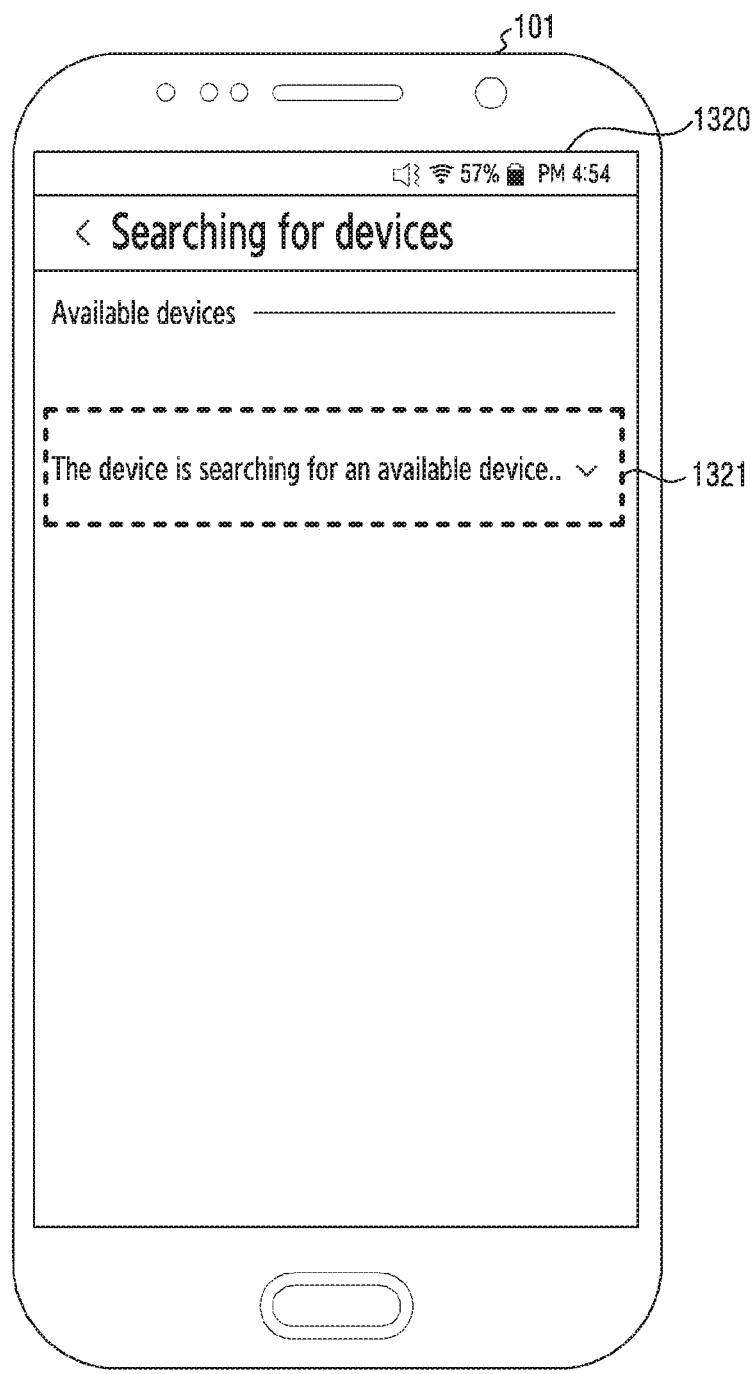
Figure 13D:
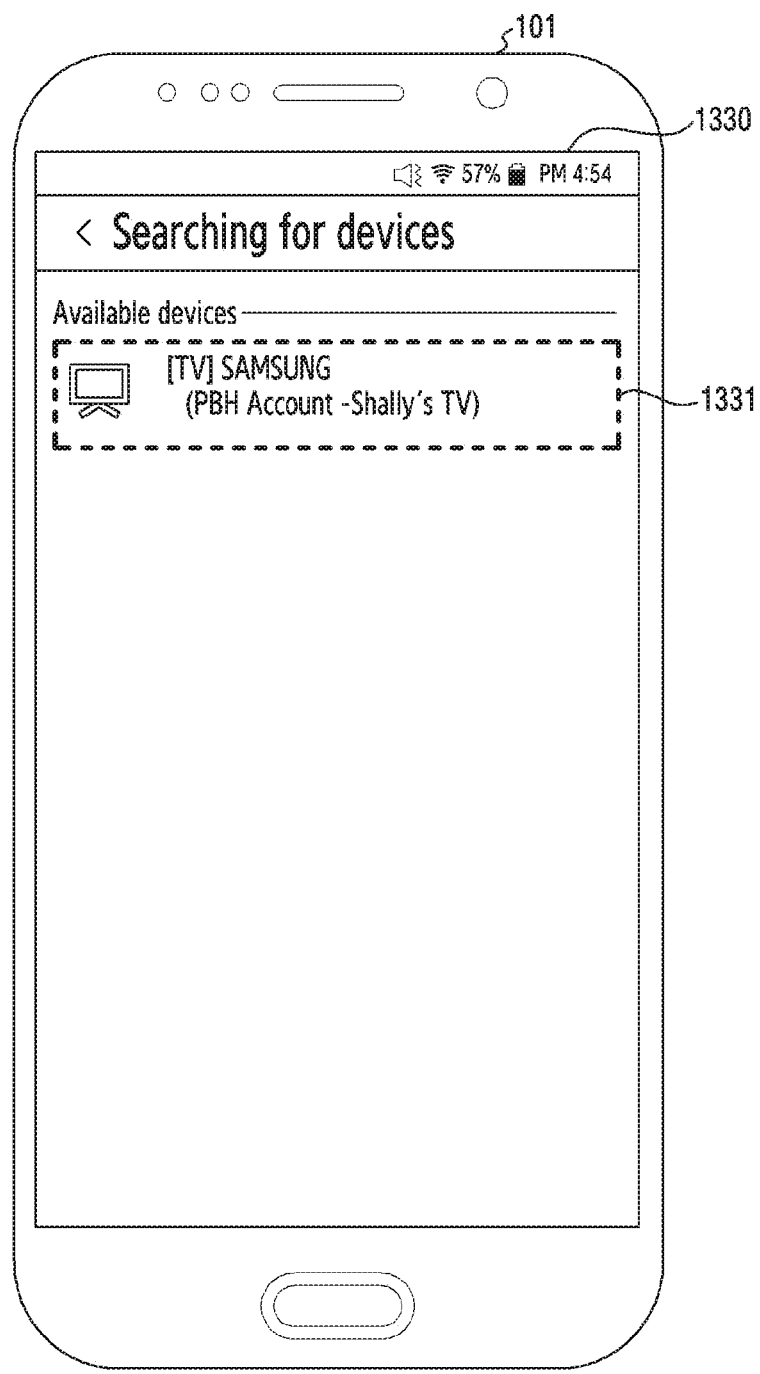

When the P2P login menu 1311 is selected, the second electronic device 101 retrieves a device capable of a P2P connection, in operation 1303 of FIG. 13A. Referring to FIG. 13C and FIG. 13D, the second electronic device 101 displays a screen 1320 for retrieving a device capable of a P2P connection adjacent to the second electronic device 101 on the display device 160, and displays a screen 1330 having a retrieved device 1331 capable of a P2P connection.

Figure 13E:
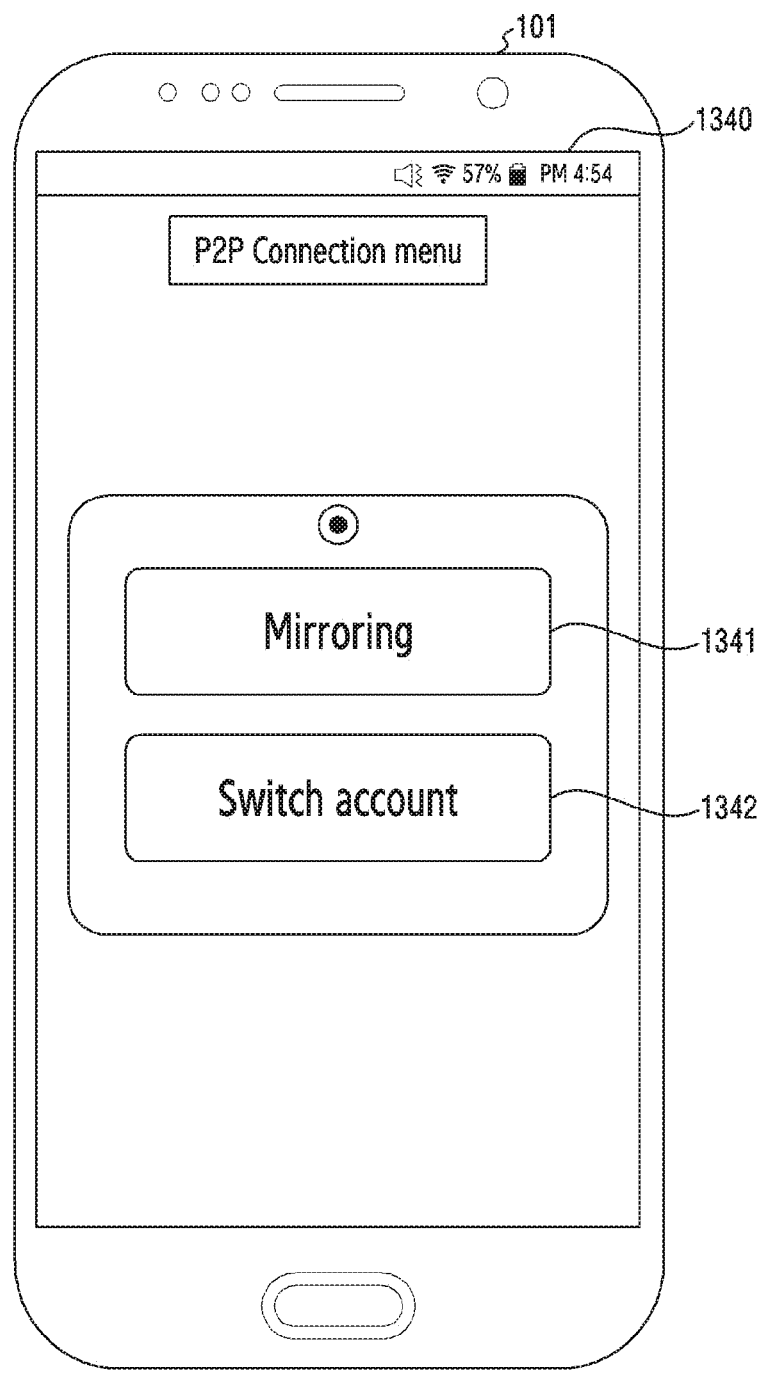

When the user selects the retrieved device 1331 capable of the P2P connection, the second electronic device 101 displays a screen including a menu as the retrieved device is selected, in operation 1305 of FIG. 13A. Referring to FIG. 13E, the second electronic device 101 displays, on the display device 160, a screen 1340 for determining whether to perform a general P2P connection 1341, such as, for example, mirroring, with the device capable of the P2P connection or to perform a P2P connection to switch an account.

Figure 13F:
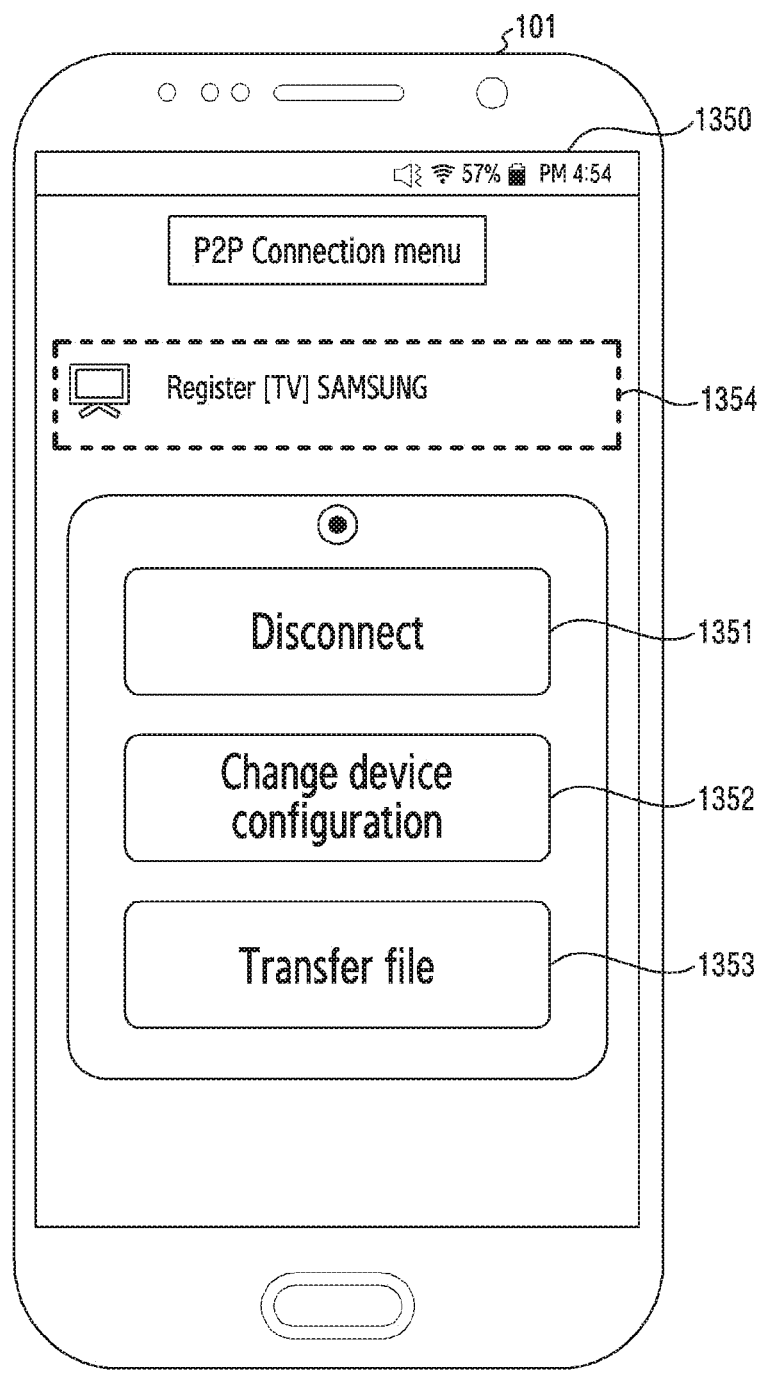

When the user selects a P2P connection method, the second electronic device 101 performs the P2P connection with the selected device according to an input to the selected P2P connection method, in operation 1307 of FIG. 13A. Referring to FIG. 13F, when the P2P connection with the selected device is performed, the second electronic device 101 displays a screen 1350 having operations that can be performed in a P2P connection state on the display device 160. When the user selects a disconnect operation 1351, the second electronic device 101 may release the P2P connection with the selected device. When the user selects a device configuration change operation 1352, the second electronic device 101 may change the configuration of the selected device based on account-related information about the second electronic device 101. When the user selects a file transfer 1353, the second electronic device 101 transmits a file selected by the user to the selected device. The screen 1350 indicating the P2P connection state may display a currently P2P-connected device 1354.

Figure 13G:
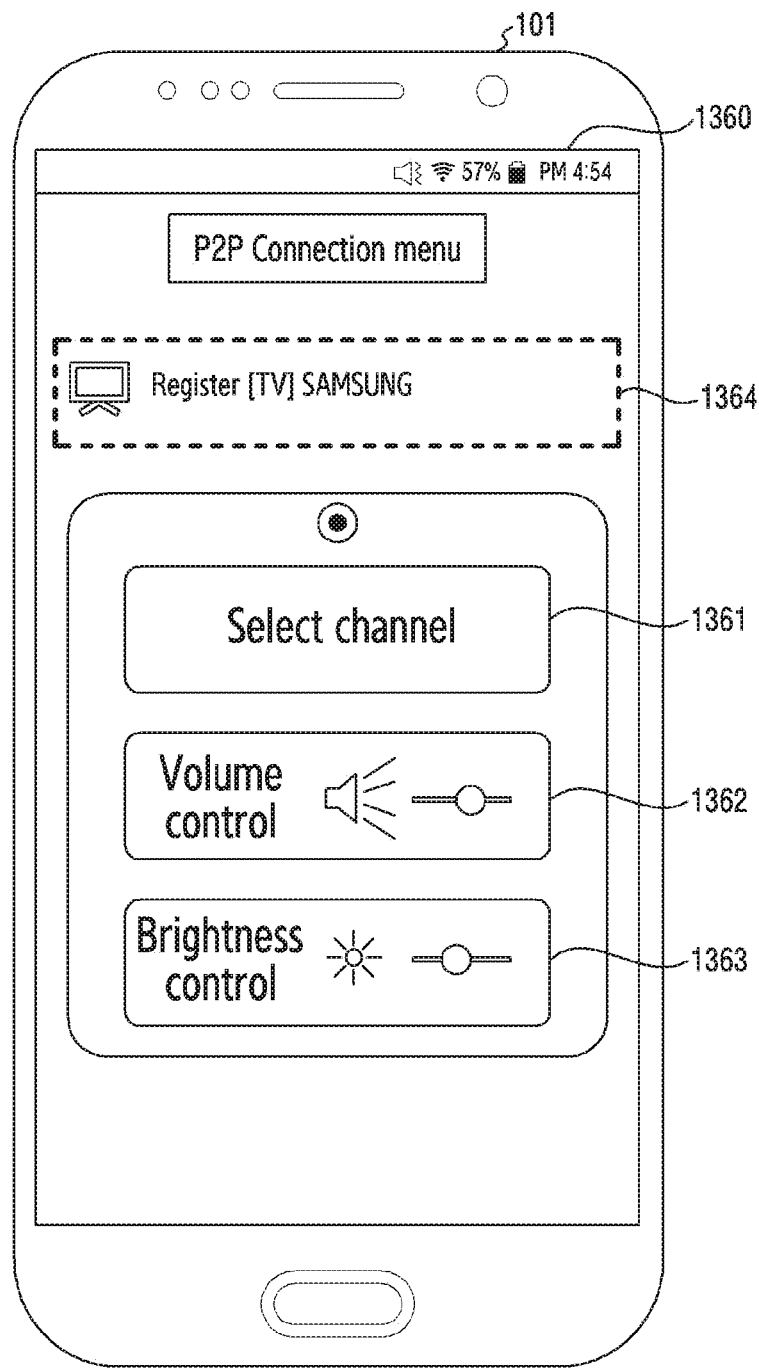

Referring to FIG. 13G, the second electronic device 101 displays a screen 1360 having a menu for controlling the selected device on the display device 160. An object displaying a currently P2P-connected device 1364 may display a device that has switched to a device account of the second electronic device 101. The user may select a channel selection operation 1361 to select a channel of the first electronic device 102 through the second electronic device 101. The user may select a volume control operation 1362 to adjust the volume of the first electronic device 102 through the second electronic device 101. The user may select a brightness control operation 1363 to adjust the brightness of the first electronic device 102 through the second electronic device 101. The screen 1360 for controlling the P2P-connected device may display a currently P2P-connected device 1364.

Figure 13H:
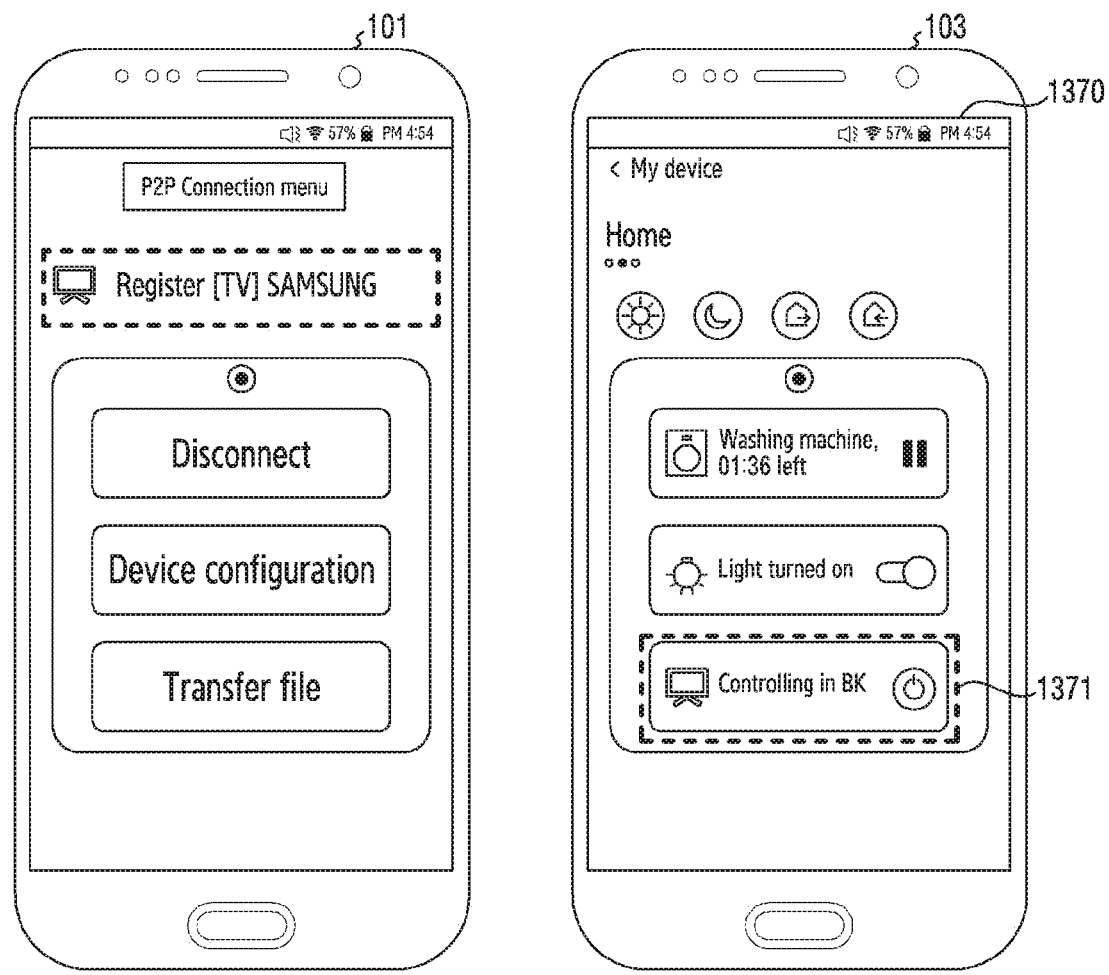

Referring to FIG. 13H, when the P2P connection is established between the second electronic device 101 and the selected device, the second electronic device 101 displays a screen 1370 indicating that the P2P-connected device is controlled (1371) with the device account of the second electronic device 101 in a control panel managing a registered device account on a third electronic device 103 having the same account as the default account of the first electronic device 102.

Figure 14A:
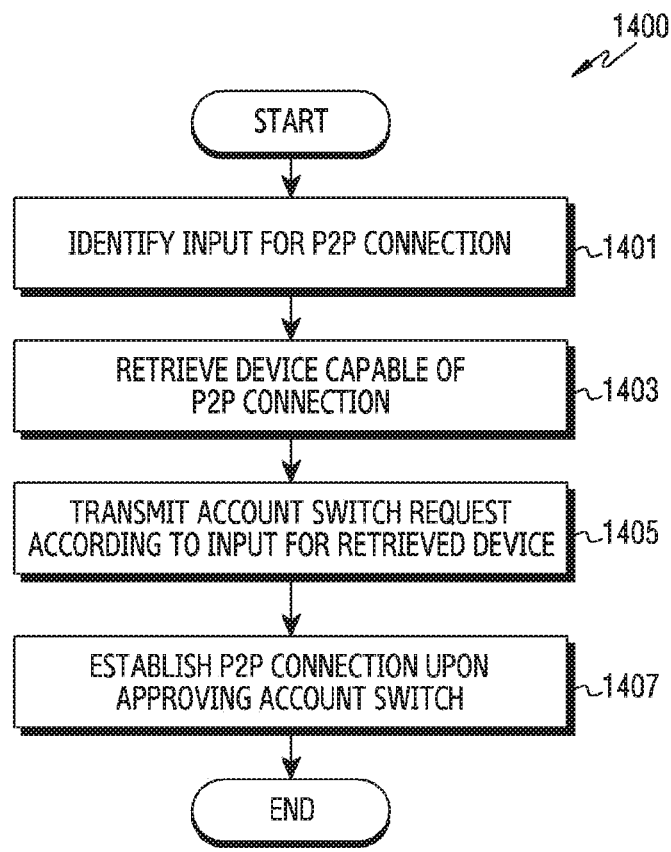
FIG. 14A is a flowchart illustrating an operating method of a first electronic device that configures a device based on account-related information, according to an embodiment.

FIG. 14A is a flowchart illustrating an operating method of a first electronic device that configures a device based on account-related information, according to an embodiment. FIGS. 14B-14E are diagrams illustrating screens of an electronic device that configures a device based on account-related information, according to embodiments. The subject of operations in a flowchart 1400 of FIG. 14A may be understood as the first electronic device 102 or a component (e.g., the processor 310) of the first electronic device 102. FIGS. 14B-14E illustrate examples of a screen of the first electronic device 102 or a screen of the second electronic device 101, when the first electronic device 102 switches a device account of the first electronic device 102 to a device account of the second electronic device 101.

Figure 14B:
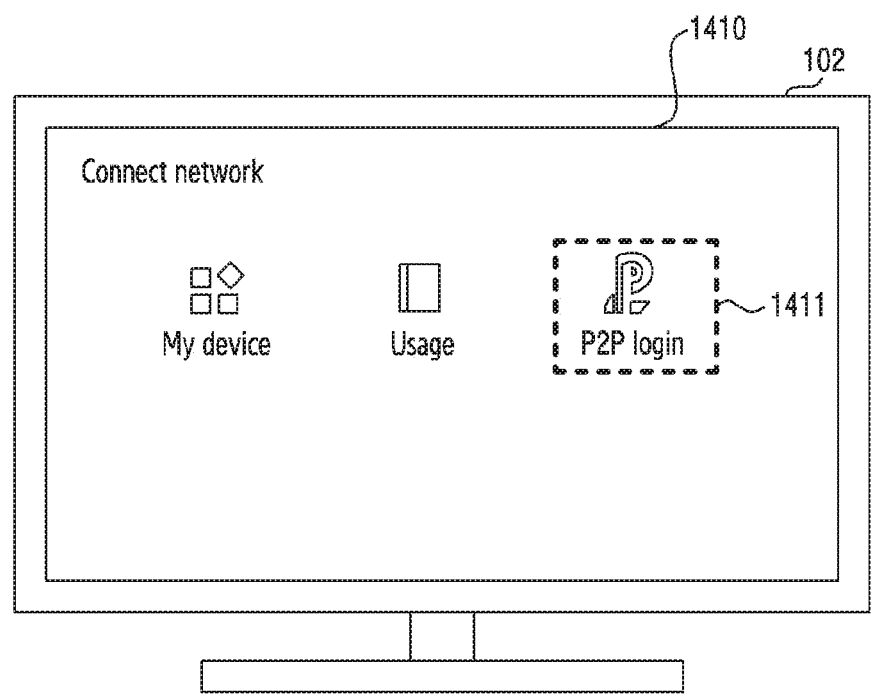
FIGS. 14B-14E are diagrams illustrating screens an electronic device that configures a device based on account-related information, according to embodiments.

Referring to FIG. 14A, in operation 1401, the first electronic device 102 displays a screen for performing a P2P connection with the second electronic device 101. Referring to FIG. 14B, the first electronic device 102 displays a screen 1410 of a general menu on the display 340, and a user may select a P2P login menu 1411 through a touch on the display 340 of the first electronic device 102 or a remote control device.

Figure 14C:
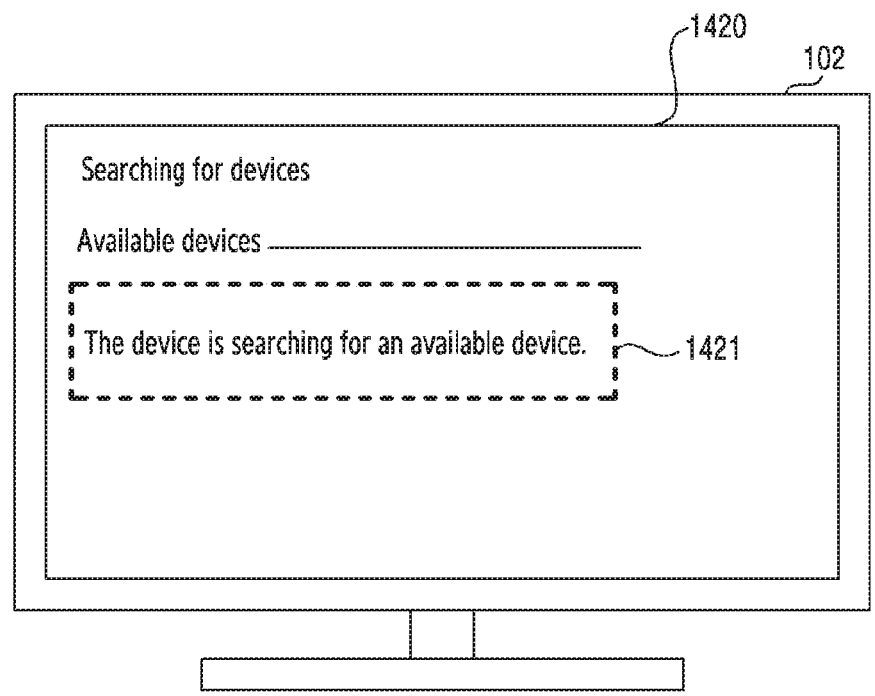
Figure 14D:
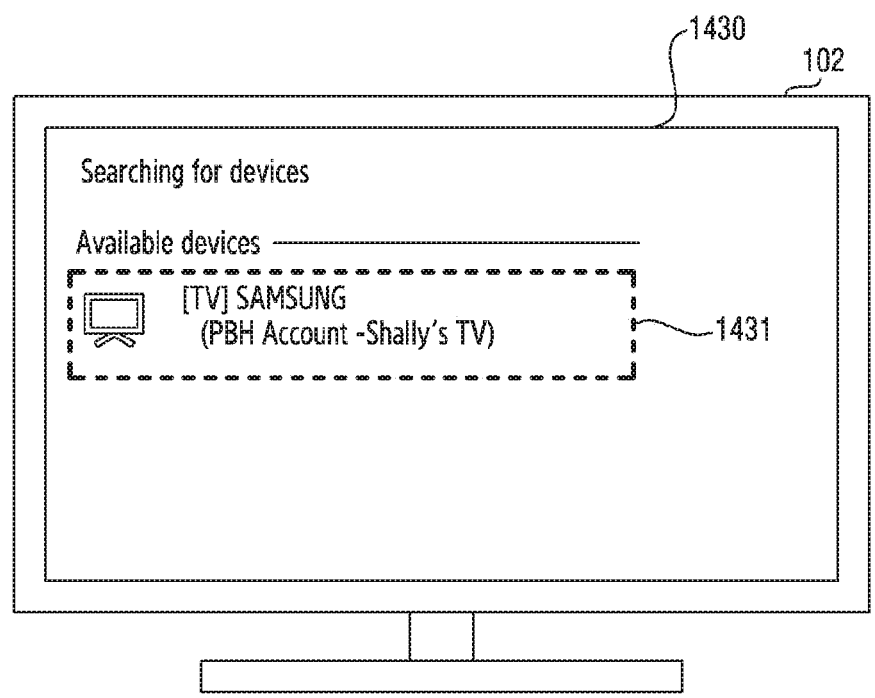

When the P2P login menu 1411 is selected, the first electronic device 102 retrieves a device capable of a P2P connection, in operation 1403 of FIG. 14A. Referring to FIG. 14C and FIG. 14D, the first electronic device 102 displays a screen 1420 for retrieving a device capable of a P2P connection adjacent to the first electronic device 102 on the display 340, and displays a screen 1430 displaying a retrieved device 1431 capable of a P2P connection.

Figure 14E:
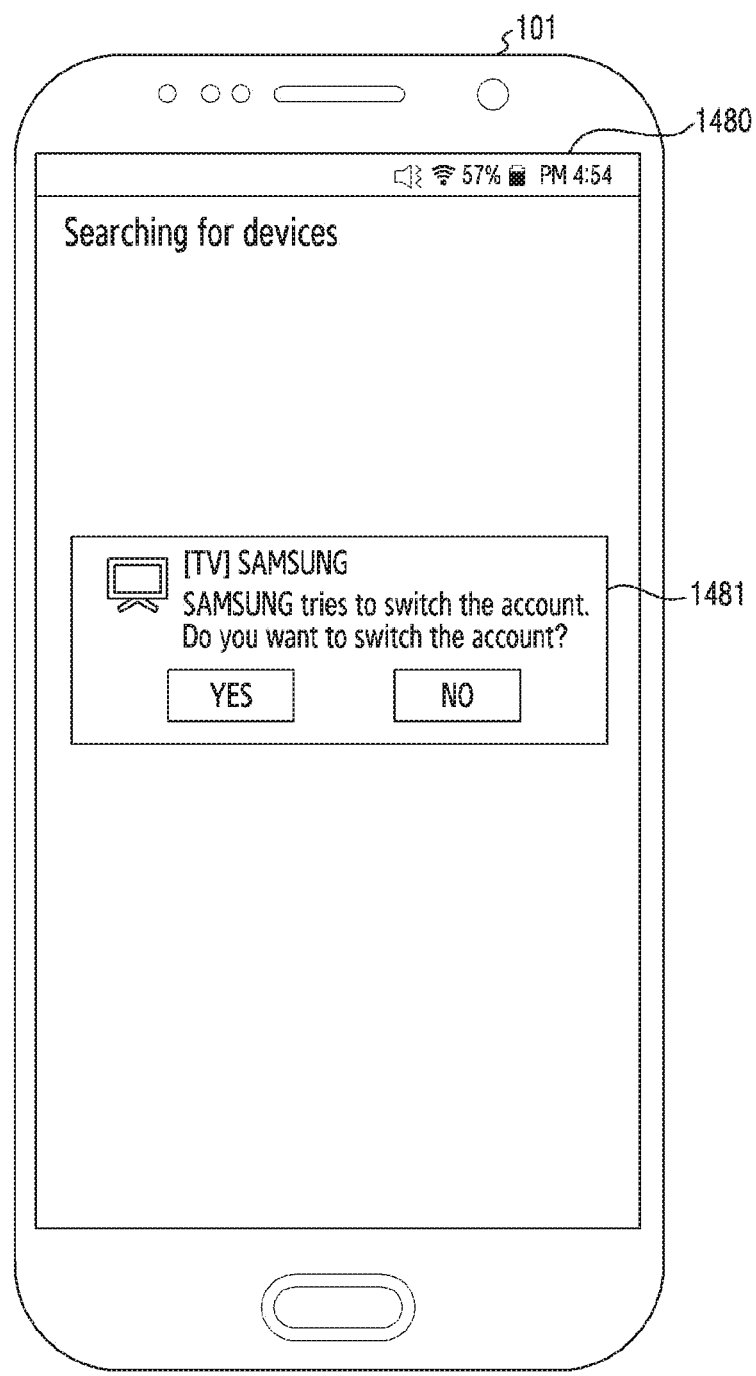

When the user selects the retrieved device 1431 capable of the P2P connection through a touch on the display 340 of the first electronic device 102 or the remote control device, the first electronic device 102 transmits an account switch request to the second electronic device 101 as the retrieved device, in operation 1405 of FIG. 14A. Referring to FIG. 14E, the second electronic device 101 receives the account switch request from the first electronic device 102 and displays a screen 1480 displaying an account switch request message 1481 on a display device 160.

In operation 1407 of FIG. 14A, the first electronic device 102 performs a P2P connection with the second electronic device 101 when the second electronic device 101 approves an account switch. The second electronic device 101 may perform a P2P connection with the first electronic device 102 in response to an input to approve an account switch.

Figure 15A:
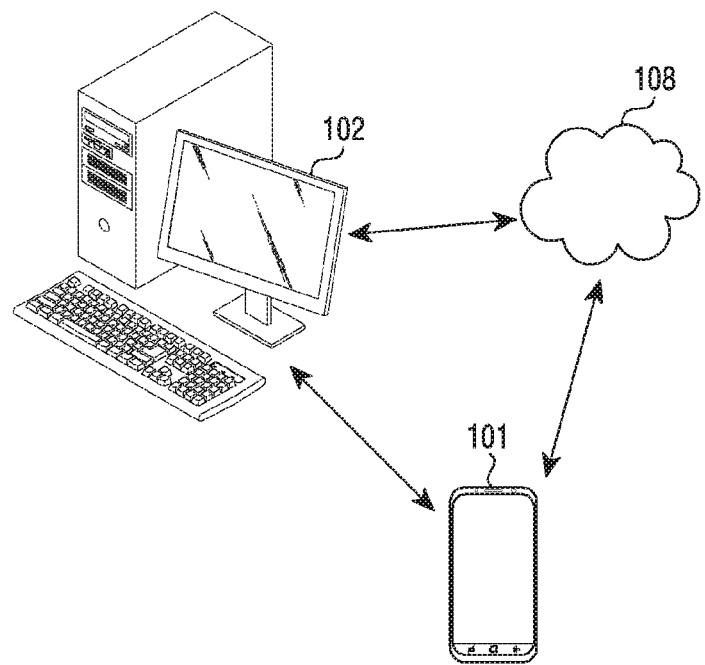
FIGS. 15A-15D are diagrams illustrating a first electronic device that configures a device based on account-related information, according to embodiments.
Figure 15B:
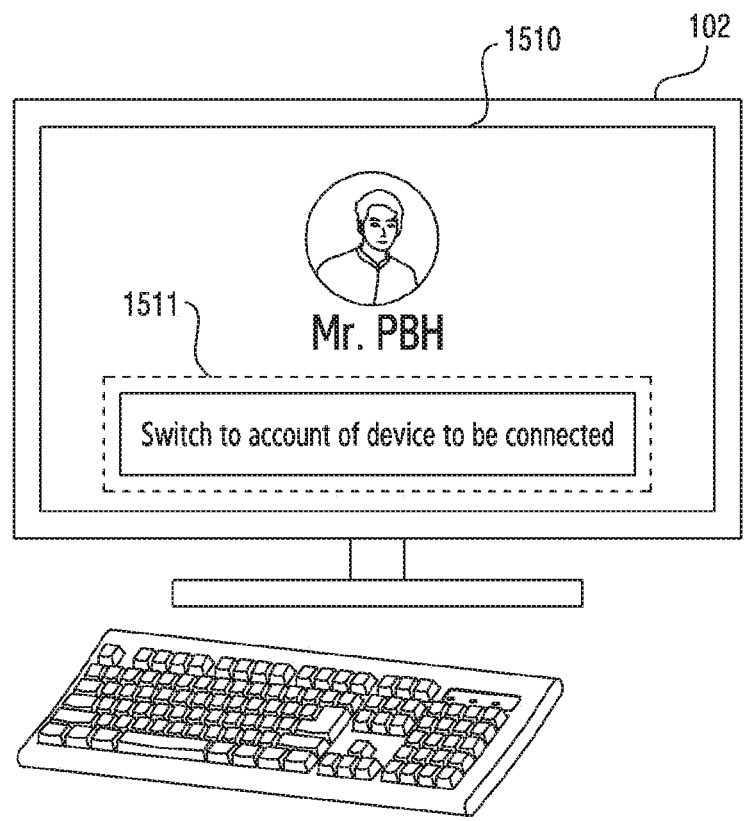
Figure 15C:
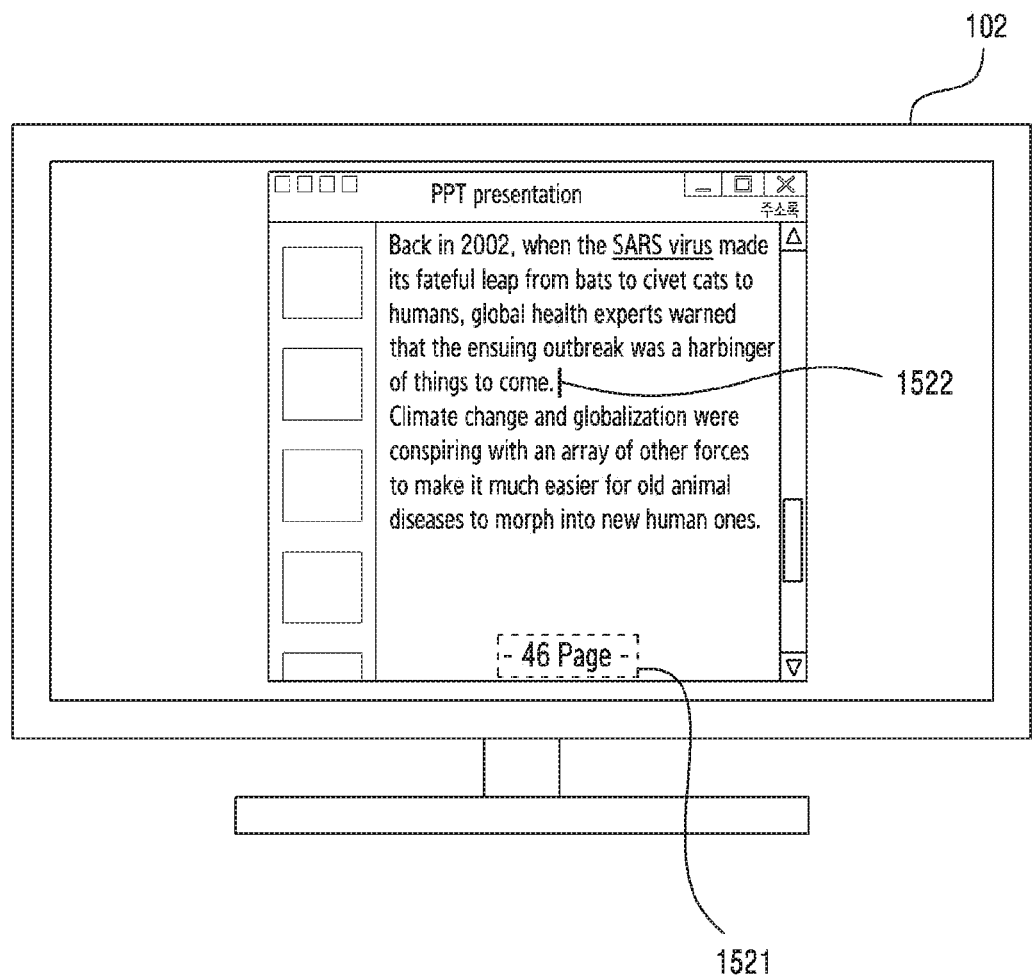
Figure 15D:
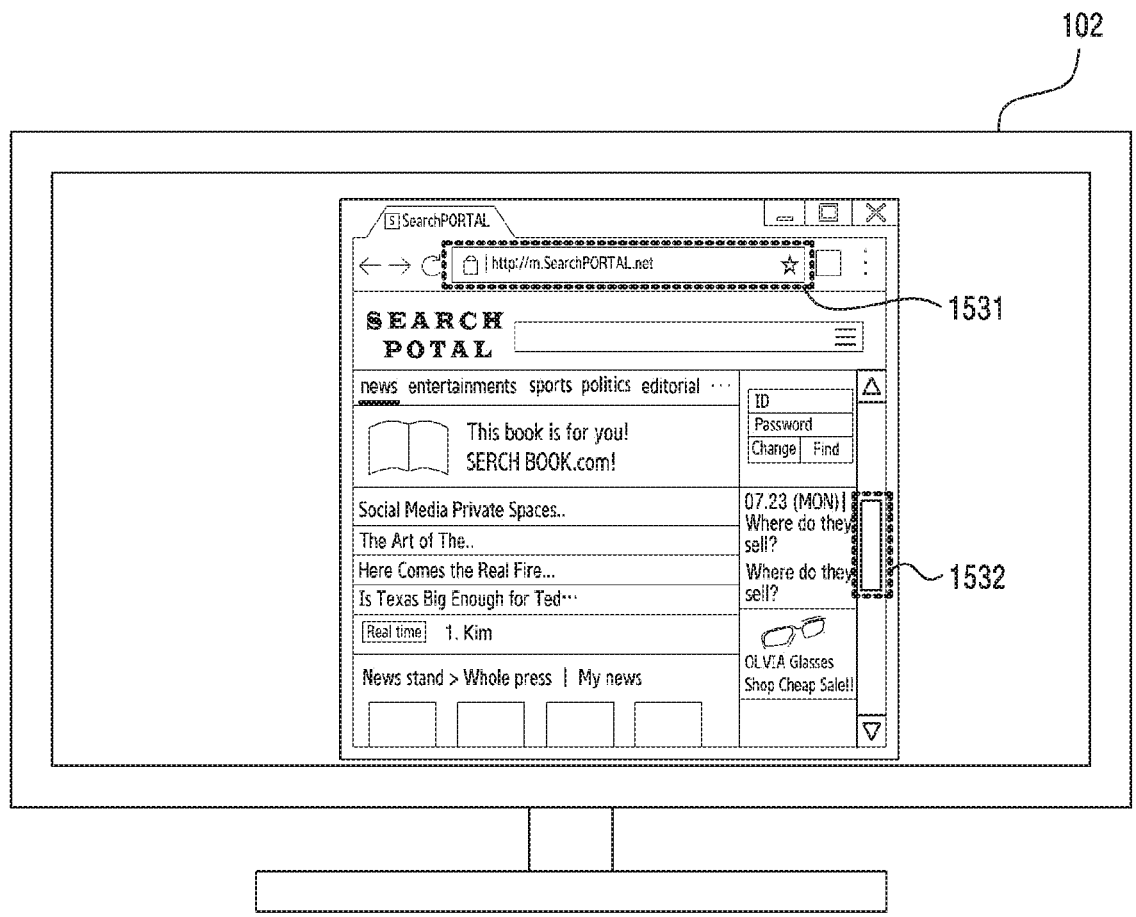

FIG. 15A is a diagram illustrating a first electronic device that configures a device based on account-related information, according to an embodiment of the disclosure. FIGS. 15B-15D are diagrams illustrating a first electronic device that configures a device based on account-related information, according to embodiments of the present disclosure. FIGS. 15A-15D illustrate a specific example in which, when the first electronic device 102 is a PC, the first electronic device 102 switches a device account of the first electronic device 102 to a device account of a second electronic device 101, and changes a configuration of the first electronic device 102 based on account-related information about the second electronic device 101.

Referring to FIG. 15A, the first electronic device 102 may identify whether the second electronic device 101 is positioned at a certain distance and at a certain angle using short-range communication (e.g., a real-time location service (RTLS) of a UWB), and may perform a P2P connection with the second electronic device 101. The first electronic device 102 may switch to the device account of the second electronic device 101 through the P2P connection. The first electronic device 102 may receive account access information from the second electronic device 101 through the P2P connection and may transmit the received account access information to a server 108. The first electronic device 102 may receive account-related information corresponding to the account access information from the server 108. The first electronic device 102 may switch to the device account of the second electronic device 101 based on the received account-related information.

Referring to FIG. 15B, the first electronic device 102 displays a screen 1510 including an object 1511 for switching to the device account of the second electronic device 101 through the P2P connection on the display 340 of the first electronic device 102. In a locked state, the first electronic device 102 may switch to the device account of the second electronic device 101 based on an input to switch to the device account of the second electronic device P2P-connected by a user. When the P2P connection is established between the first electronic device 102 and the second electronic device 101, the second electronic device 101 may display a screen for switching the first electronic device 102 to the device account of the second electronic device 101 on the display device 160 of the second electronic device 101. When the second electronic device 101 approves a switch of the first electronic device 102 to the device account of the second electronic device 101, the first electronic device 102 may transition to a state for switching to the device account of the second electronic device 101.

The first electronic device 102 may change a configuration related to the PC (e.g., keyboard settings, mouse sensitivity, and display settings) or a configuration related to PC payment based on environmental information included in the account-related information about the device account of the second electronic device 101. After switching the device account of the first electronic device 102 to the device account of the second electronic device 101, the first electronic device 102 may receive configuration information about an office application, an Internet browser, or various web services included in an OS account-related information (e.g., a Windows account-related information) linked with the device account of the second electronic device 101 from the server 108.

Referring to FIG. 15C, the first electronic device 102 displays a document being edited in the second electronic device 101 based on the configuration information about the office application. The configuration information about the office application may include information about the document being edited in the second electronic device 101. The first electronic device 102 may switch to the device account of the second electronic device 101 and may receive the configuration information about the office application including the information about the document being edited in the second electronic device 101 from the server 108. The first electronic device 102 may load the document being edited in the second electronic device 101 through the office application. The first electronic device 102 may scroll through the document executed through the office application to a page 1521 being edited in the second electronic device 101 based on the information (e.g., location information about the document) about the document being edited in the second electronic device 101 and may move a cursor to a cursor position 1522 on a portion being edited in the second electronic device 101.

Referring to FIG. 15D, the first electronic device 102 displays a website being executed in the second electronic device 101 based on the configuration information about the Internet browser. The first electronic device 102 may go to a web address 1531 being executed in the second electronic device 101 based on the configuration information about the Internet browser executed in the second electronic device 101, and may scroll 1532 to a webpage displayed in the second electronic device 101 in the website.

Figure 16:
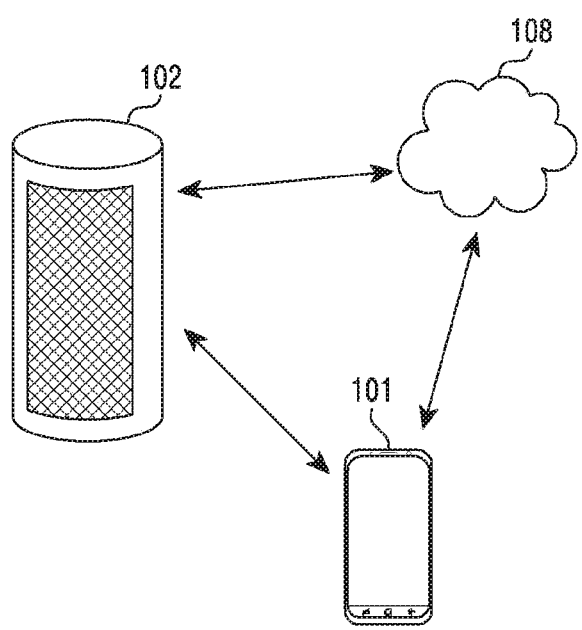
FIG. 16 is a diagram illustrating a method for configuring a device based on account-related information, according to an embodiment.

FIG. 16 is a diagram illustrating a method for configuring a device based on account-related information, according to an embodiment. FIG. 16 illustrates a specific example in which, when the first electronic device 102 is an artificial intelligence speaker, the first electronic device 102 switches to a device account of the second electronic device 101 and changes a configuration of the first electronic device 102 based on account-related information about the second electronic device 101.

Referring to FIG. 16, the first electronic device 102 may identify whether the second electronic device 101 is positioned at a certain distance and at a certain angle using short-range communication (e.g., Wi-Fi Direct, Wi-Fi Aware, or BT/BLE), and may perform a P2P connection with the second electronic device 101. The first electronic device 102 may switch to the device account of the second electronic device 101 through the P2P connection. The first electronic device 102 may receive account access information from the second electronic device 101 through the P2P connection and may transmit the received account access information to a server 108. The first electronic device 102 may receive account-related information corresponding to the account access information from the server 108. The first electronic device 102 may switch to the device account of the second electronic device 101 based on the received account-related information.

After switching a device account of the first electronic device 102 to the device account of the second electronic device 101, the first electronic device 102 may load configuration information included in service account-related information liked with the device account of the second electronic device 101. The first electronic device 102 may update the service account-related information liked with the device account of the second electronic device 101, for example, music service account information, based on pieces or data input to the first electronic device 102 (e.g., instructions input by a user or executed pieces of music).

The first electronic device 102 may identify configuration information about the second electronic device 101 in a network connection operation, and may display an input window for service selection on a screen of the first electronic device 102 to induce a user's selection when the second electronic device 101 supports exchanging account access information. When the second electronic device 101 does not support exchanging account access information, the first electronic device 102 may provide a general P2P file exchange service.

User experience (UX) associated with a P2P connection may be provided by a configuration window automatically popping up according to a user setting or a device setting or may be manually executed by the user through configuration UX.

When the second electronic device 101 approaches the first electronic device 102, the second electronic device 101 may receive a signal broadcast from the first electronic device 102 and may perform a local connection between the two devices. This local connection may be automatically performed according to the configurations of the first electronic device 102 and the second electronic device 101, and connection-related selection UX, for example, a pop-up window, may be displayed for the user on the screen.

The second electronic device 101 may perform a local connection with the first electronic device 102 through the user's voice input. The local connection may be automatically performed according to the configuration of the second electronic device 101, and connection-related selection UX, for example, a pop-up window, may be displayed for the user on the screen of the first electronic device 102 and/or the second electronic device 101.

The second electronic device 101 may receive information about an electronic device existing at a position from an access point or the server 108 based on an operation of the second electronic device 101 connecting to the access point connected to the first electronic device 102 or an operation of the second electronic device 101 entering a specific region using a geofence, the two devices may be connected according to preset information in a discovery operation of the first electronic device 102 retrieving the second electronic device 101, and connection-related selection UX, for example, a pop-up window, may be displayed for the user on the screen.

The electronic device, according to various embodiments, may be one of various types of electronic devices. The electronic devices may include a portable communication device (e.g., a smartphone), a computer device, a portable multimedia device, a portable medical device, a camera, a wearable device, or a home appliance. However, the electronic devices are not limited to those described above.

A method and an electronic device therefor according to various embodiments may readily connect a shared device to a user's account, thereby configuring the shared device into a user preset environment and efficiently learning various pieces of data generated from the shared device with the user's account for an artificial intelligence (AI) service.

In addition, a method and an electronic device therefor according to various embodiments may retrieve neighboring electronic devices using local connectivity, particularly a peer-to-peer (P2P) connection not associated with a server or an access point, may temporarily switch a shared device to an account of an electronic device through a practical security method, and may utilize the shared device as a personalized device. Temporary user switching of the shared device, return of the user to a master account, and/or user experience (UX) unified with the user's device may facilitate the use of the shared device.

Various embodiments of the present disclosure and the terms used therein are not intended to limit the technological features set forth herein to particular embodiments and include various changes, equivalents, or replacements for a corresponding embodiment.

A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

Herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, a module may be implemented in a form of an application-specific integrated circuit (ASIC).

Various embodiments, as set forth herein, may be implemented as software (e.g., the program 140 of FIG. 1) including one or more instructions that are stored in a storage medium (e.g., internal memory 136 or external memory 138 of FIG. 1) that is readable by a machine (e.g., the electronic device 101 of FIG. 1). For example, a processor(e.g., the processor 120 of FIG. 1) of the machine (e.g., the electronic device 101 of FIG. 1) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device registered with first account comprising:
    a display;
    a communication unit; and
    a processor configured to:
        receive account access information from an external electronic device using a local network, wherein the external electronic device is registered with second account,
        transmit the account access information to a server,
        receive account-related information about the external electronic device from the server,
        log into the second account of the external electronic device by switching the first account to the second account based on the account-related information, and
        change a configuration of the electronic device while logged into the second account of the external electronic device.

2. The electronic device of claim 1, wherein the processor is further configured to receive the account access information from the external electronic device, when the electronic device is directly connected to the external electronic device through the local network, and
    wherein the connection is based on one of Wi-Fi Direct, Wi-Fi Aware, ultra-wideband (UWB), Bluetooth, and long term evolution (LTE)-Direct.

3. The electronic device of claim 2, wherein the processor is further configured to:
    log off from the second account of the external electronic device upon releasing the connection through the local network,
    log into the first account of the electronic device, and
    restore the configuration of the electronic device.

4. The electronic device of claim 1, wherein the account access information comprises media access control (MAC) specifying the external electronic device and information for identifying the second account of the external electronic device based on the MAC.

5. The electronic device of claim 1, wherein the account-related information comprises at least one of hardware account-related information, operating system (OS) account-related information, network provider and service provider account-related information, information about at least one service account linked with the second account of the external electronic device, information about at least one application installed with the second account of the external electronic device, or environmental information about the electronic device.

6. The electronic device of claim 5, wherein the processor is further configured to log into the at least one service account linked with the second account of the external electronic device or account of the at least one application installed in the external electronic device based on the account-related information.

7. The electronic device of claim 5, wherein the processor is further configured to change a configuration of an application installed in the electronic device based on the account-related information.

8. The electronic device of claim 1, wherein the processor is further configured to:
    receive, from the server, at least one of information about at least one service account linked with the second account of the external electronic device, information about at least one application installed with the second account of the external electronic device, and environmental information about the electronic device, when logging into the second account of the external electronic device.

9. An electronic device comprising:
    a communication unit;
    a display; and
    a processor configured to:
        detect an input to establish a connection with an external electronic device, wherein the external electronic device is registered with first account,
        establish a direct connection with the external electronic device through a local network upon detecting the input, and
        transmit account access information to the external electronic device through the connection,
    wherein account-related information about the electronic device is obtained based on the account access information and is used by the external electronic device to log into second account of the electronic device by switching the first account to the second account, and to change a configuration of the external electronic device.

10. The electronic device of claim 9, wherein the processor is further configured to:

display a first interface comprising a first object for connecting with the external electronic device, display a second interface comprising a second object indicating a general connection and a third object indicating a connection for an account switch, upon detecting a first input to the first object, and establish the connection with the external electronic device and transmit the account access information, upon detecting a second input to the third object.

11. The electronic device of claim 9, wherein the account access information comprises media access control (MAC) specifying the electronic device and information for identifying the second account of the electronic device based on the MAC.

12. The electronic device of claim 9, wherein the account-related information comprises at least one of hardware account-related information, operating system (OS) account-related information, network provider and service provider account-related information, information about at least one service account linked with the second account of the electronic device, information about at least one application installed with the second account of the electronic device, and environmental information about the external electronic device.

13. The electronic device of claim 9, wherein the processor is further configured to generate a temporary account for the second account of the electronic device, wherein the account access information is information about the temporary account.

14. The electronic device of claim 13, wherein the processor is further configured to delete the information about the temporary account when the connection with the external electronic device is released.

15. The electronic device of claim 9, wherein the processor is further configured to transmit a connection release request message to the external electronic device when a strength of a communication signal between the external electronic device and the electronic device is determined to be a predetermined strength or less.

16. The electronic device of claim 9, wherein the processor is further configured to transmit a message requesting logging off of the external electronic device from the second account of the electronic device to a server, when the connection with the external electronic device is released.

17. The electronic device of claim 9, wherein the processor is further configured to transmit the account access information to the external electronic device when identifying that the electronic device is positioned at a predetermined distance and at a predetermined angle from the external electronic device.

18. An operating method of an electronic device registered with first account, the method comprising:

receiving account access information from an external electronic device, wherein the external electronic device is registered with second account;

transmitting the account access information to a server;

receiving account-related information about the external electronic device from the server;

logging into the second account of the external electronic device by switching the first account to the second account based on the account-related information; and changing a configuration of the electronic device while logged into the second account of the external electronic device.

19. The method of claim 18, further comprising:

receiving, from the server, at least one of information about at least one service account linked with the second account of the external electronic device, information about at least one application installed with the second account of the external electronic device, and environmental information about the electronic device when logging into the second account of the external electronic device.

20. The method of claim 18, wherein receiving the account access information from the external electronic device comprises:

displaying a first interface comprising a first object for connecting with the external electronic device;

requesting the account switch to the external electronic device, upon detecting an input to the first object; and receiving the account access information from the external electronic device, upon requesting the account switch from the external electronic device.

* * * * *